(12) United States Patent
Watanabe

(10) Patent No.: US 10,341,934 B2
(45) Date of Patent: Jul. 2, 2019

(54) WIRELESS APPARATUS, NETWORK SYSTEM AND CONTROL METHOD

(71) Applicant: Futaba Corporation, Mobara-shi, Chiba-ken (JP)

(72) Inventor: Kazuhito Watanabe, Mobara (JP)

(73) Assignee: FUTABA CORPORATION, Chiba-Ken (JP)

( * ) Notice: Subject to any disclaimer, the term of this patent is extended or adjusted under 35 U.S.C. 154(b) by 125 days.

(21) Appl. No.: 15/235,228

(22) Filed: Aug. 12, 2016

(65) Prior Publication Data

US 2017/0085489 A1    Mar. 23, 2017

(30) Foreign Application Priority Data

Sep. 17, 2015    (JP) .................................. 2015-184048

(51) Int. Cl.
*H04W 40/24*        (2009.01)

(52) U.S. Cl.
CPC .................... *H04W 40/24* (2013.01)

(58) Field of Classification Search
CPC .................... H04H 1/04; G06F 15/16
USPC ............. 370/252–390; 709/206–230
See application file for complete search history.

(56) References Cited

U.S. PATENT DOCUMENTS

2014/0308937 A1* 10/2014 Han ................. G06Q 50/10
455/414.2

2015/0068069 A1* 3/2015 Tran .................. H04B 1/385
36/136
2016/0006684 A1* 1/2016 Akiyoshi ........... H04L 61/103
709/245
2016/0295453 A1   10/2016 Minamiyama et al.

FOREIGN PATENT DOCUMENTS

DE    11 2014 005 395 T5    8/2016
JP           2011-239076 A   11/2011
WO         2012/165938 A1   12/2012

OTHER PUBLICATIONS

German Office Action dated Aug. 7, 2018 issued in corresponding German Patent Application No. 10 2016 011 182.8 and English translation thereof.

* cited by examiner

*Primary Examiner* — Iqbal Zaidi
(74) *Attorney, Agent, or Firm* — Bacon & Thomas, PLLC

(57) ABSTRACT

A wireless apparatus includes a communication control unit, a transmission unit for transmitting a message packet, a reception unit for receiving the message packet, and a storage unit for storing a transfer table in which transfer destination information is linked with a transfer priority indicating its priority among wireless apparatuses for transferring the message packet to a transfer destination. The communication control unit refers to the transfer table based on information on a transmission source and a transmission destination included in the received message packet. When the wireless apparatus of the transfer destination or the transfer priority is not determined, the communication control unit performs a transfer operation using broadcast communication. When the wireless apparatus of the transfer destination and the transfer priority are determined, the communication control unit performs a transfer operation using unicast communication in which the wireless apparatus of the transfer destination is specified.

7 Claims, 38 Drawing Sheets

FIG.4A

| DEVICE | 1ST | | 2ND | |
|---|---|---|---|---|
| | TRANSFER STATION | LINK SCORE | TRANSFER STATION | LINK SCORE |
| 1 | E | 180 | C | 153 |
| 2 | E | 180 | C | 153 |
| 3 | B | 192 | E | 180 |
| 4 | B | 192 | E | 180 |
| 5 | B | 192 | – | – |
| ⋮ | ⋮ | ⋮ | ⋮ | ⋮ |

FIG.4B

| | 1st | 2nd |
|---|---|---|
| 1 | E | C |
| 2 | E | C |
| 3 | B | E |
| 4 | B | E |
| 5 | B | – |
| ⋮ | ⋮ | ⋮ |

FIG. 6A

| Src Mac | Dist Add | Pri | Fwd Mac | |
|---------|----------|-----|---------|---|
| A | 3 | 2 | C | ← R1 |
| A | 5 | 1 | E | ← R2 |
| B | 5 | 1 | E | ← R3 |
| C | 5 | 2 | E | ← R4 |
| ⋮ | ⋮ | ⋮ | ⋮ | |

FIG. 6B

| Src | Dist | Pri | Fwd |
|-----|------|-----|-----|
| A | 3 | 2 | C |
| A | 5 | 1 | E |
| B | 5 | 1 | E |
| C | 5 | 2 | E |
| ⋮ | ⋮ | ⋮ | ⋮ |

WIRELESS APPARATUS, NETWORK SYSTEM AND CONTROL METHOD

FIELD OF THE INVENTION

The present disclosure relates to a field of an Ad-hoc network where communication takes places through a plurality of wireless apparatuses.

BACKGROUND OF THE INVENTION

Recently, an Ad-hoc network attracts attention. In the Ad-hoc network, a plurality of wireless apparatuses is interspersed within an area and wireless apparatuses separated by a distance that does not allow direct communication therebetween can communicate with each other via another wireless apparatus. Such a network is referred to as a multi-hop networks.

As for a representative communication method of the multi-hop network, there is known a routing method (see, e.g., Japanese Patent Application Publication Nos. 2005-064721 and 2008-066861) or a flooding method.

In the case of employing the routing method, a routing table is provided for each wireless apparatus and communication takes place by determining a communication path based on the corresponding routing table.

The routing table stores communication paths to be used as numerical values. The numerical values are calculated based on, e.g., the number of hop steps to a target wireless apparatus. For example, where there are a communication path A passing through two wireless apparatuses to the target wireless apparatus and a communication path B passing through three wireless apparatuses to the target wireless apparatus, the communication path A is selected first.

On the other hand, in the case of employing the flooding method, when a wireless apparatus receives information from another wireless apparatus, the information is transmitted to neighboring wireless apparatuses by broadcast communication. By repeating such transmission/reception, the information is transferred to the target wireless apparatus.

However, in the routing method in which a communication path is determined only by the number of hop steps, even if a communication quality of the communication path deteriorates, another communication path may not be selected unless the communication is completely lost.

In the flooding method, the transmission/reception is repeated by the broadcast, so that a plurality of wireless apparatuses is in a transmission state at the same time. As a result, the amount of communication data is increased and the possibility of collision of wireless communication is increased.

SUMMARY OF THE INVENTION

In view of the above, the present disclosure provides a technique for stabilizing communication while reducing the amount of communication.

In accordance with a first aspect of the present invention, there is provided a wireless apparatus forming a wireless mesh network where a message packet is transferred, including: a communication control unit configured to control communication; a transmission unit configured to transmit the message packet; a reception unit configured to receive the message packet; and a storage unit configured to store a transfer table in which transfer destination information is linked with a transfer priority indicating its priority among wireless apparatuses for transferring the message packet to a transfer destination, wherein the communication control unit refers to the transfer table stored in the storage unit based on information on a transmission source and a transmission destination included in the received message packet, wherein when the wireless apparatus of the transfer destination or the transfer priority is not determined, the communication control unit performs a transfer operation using broadcast communication in which the wireless apparatus of the transfer destination is not specified, and when the wireless apparatus of the transfer destination and the transfer priority are determined, the communication control unit performs a transfer operation using unicast communication in which the wireless apparatus of the transfer destination is specified.

Therefore, the broadcast communication is shifted to the unicast communication in the order of the wireless apparatuses of which information is stored in the transfer table.

When a message packet received from another wireless apparatus is transferred, if the wireless apparatus of the transfer destination or the transfer priority is not determined, the communication control unit may perform, after random wait time elapses, the transfer operation using the broadcast communication in which the wireless apparatus of the transfer destination is not specified, and if the wireless apparatus of the transfer destination and the transfer priority are determined, the communication control unit may perform, after wait time set based on the transfer priority elapses, the transfer operation using the unicast communication in which the wireless apparatus of the transfer destination is specified.

Therefore, a plurality of wireless apparatuses transfers the message packet to the wireless apparatus of the transfer destination after the wait time elapses.

When the reception unit receives the message packet that has been transferred to the wireless apparatus of the transfer destination by using the unicast communication, the communication control unit may consider the received message packet as an acknowledgement packet.

Accordingly, the wireless apparatus of the destination does not need to transmit the acknowledgement packet.

When a communication path is not determined, the communication control unit may not allow the transmission unit to transmit a dedicated packet for determining a communication path.

Accordingly, a communication path having high priority is determined during transmission/reception of the message packet including the user data.

The transfer table may store information of which transfer priority is undetermined or at least first or second.

Accordingly, the information stored in the transfer table is restricted.

In accordance with a second aspect of the present invention, there is provided a network system including a plurality of wireless apparatuses, each of which including: a communication control unit configured to control communication; a transmission unit configured to transmit a message packet; a reception unit configured to receive the message packet; and a storage unit configured to store a transfer table in which transfer destination information is linked with a transfer priority indicating its priority among wireless apparatuses for transferring the message packet to a transfer destination, wherein the communication control unit refers to the transfer table stored in the storage unit based on information on a transmission source and a transmission destination included in the received message packet, wherein when the wireless apparatus of the transfer destination or the transfer priority is not determined, the communication control unit performs a transfer operation using broadcast communication in which the wireless apparatus of the transfer destination is not specified, and when the wireless apparatus of the transfer destination and the transfer priority are determined, the communication control unit performs a transfer operation using unicast communication in which the wireless apparatus of the transfer destination is specified.

This network system realizes the environment in which the stable communication takes place while reducing the amount of communication.

In accordance with a third aspect of the present invention, there is provided a control method of a wireless apparatus including a transmission unit configured to transmit a message packet, a reception unit configured to receive the message packet, and a storage unit configured to store a transfer table in which transfer destination information is linked with a transfer priority indicating its priority among wireless apparatuses for transferring the message packet to a transfer destination, the method including: referring to the transfer table stored in the storage unit based on information on a transmission source and a transmission destination included in the received message packet; performing, when the wireless apparatus of the transfer destination or the transfer priority is not determined, a transfer operation using broadcast communication in which the wireless apparatus of the transfer destination is not specified; and performing, when the wireless apparatus of the transfer destination and the transfer priority are determined, a transfer operation using unicast communication in which the wireless apparatus of the transfer destination is specified.

The network system is realized by this control method.

The present disclosure stabilizes communication while reducing the amount of communication.

BRIEF DESCRIPTION OF THE DRAWINGS

The objects and features of the disclosure will become apparent from the following description of embodiments, given in conjunction with the accompanying drawings, in which:

FIGS. 4A and 4B show an address basis status;

FIGS. 6A and 6B show a transfer table;

DETAILED DESCRIPTION OF THE EMBODIMENTS

Figure 1:
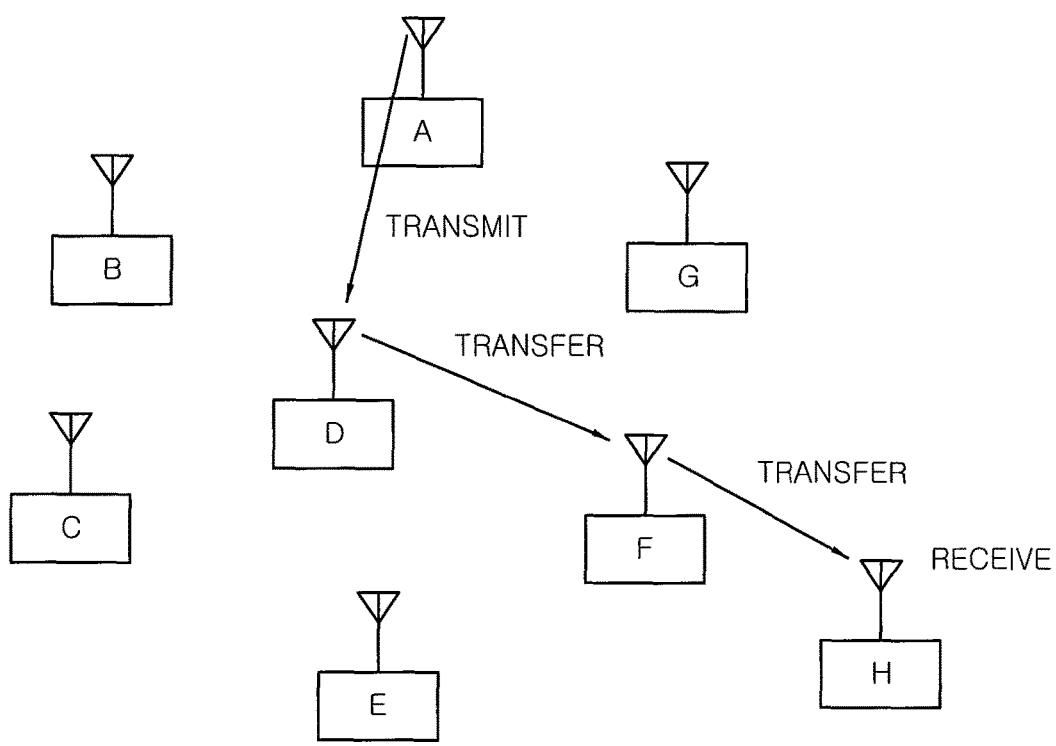
FIG. 1 shows an outline of a wireless mesh network.

Hereinafter, embodiments will be described in the following order.
1. Configuration of wireless apparatus
2. Packet structure
2-1. Message packet
2-2. Acknowledgement packet
3. Table
3-1. Address basis status
3-2. Transfer table
4. Exemplary process of creating address basis status and transfer table
5. Transfer timing
5-1. First example
5-2. Second example
5-3. Third example
6. Modification
7. Statistics 1. Configuration of Wireless Apparatus Hereinafter, a wireless apparatus according to an embodiment will be described with reference to the drawings. FIG. 1 shows a concept of a wireless mesh network.

The wireless mesh network shown in FIG. 1 includes 8 wireless apparatuses A to H. The wireless apparatuses A to H can directly communicate with other wireless apparatuses positioned within communication distances (hereinafter, referred to as "within communication ranges"). The communication distances of the wireless apparatuses A to H are, e.g., several tens of meters to several hundreds of meters.

In the case of transmitting information from one wireless apparatus to another wireless apparatus positioned outside the communication range, the information is transmitted via several wireless apparatuses. For example, when the information is transmitted from the wireless apparatus A to the wireless apparatus H, the information is transmitted via wireless apparatuses D and F as shown in FIG. 1. At this time, the wireless apparatuses D and F perform transfer processes.

The number of wireless apparatuses constituting the wireless mesh network is not limited to eight. In the following description, there will be described an example in which the wireless apparatuses are fixed to respective positions. However, all or a part of the wireless apparatuses may be moved.

A frequency band used in the wireless mesh network is close to, e.g., 429 MHz, 920 MHz, 1.2 GHz, 2.4 GHz and the like.

Figure 2:
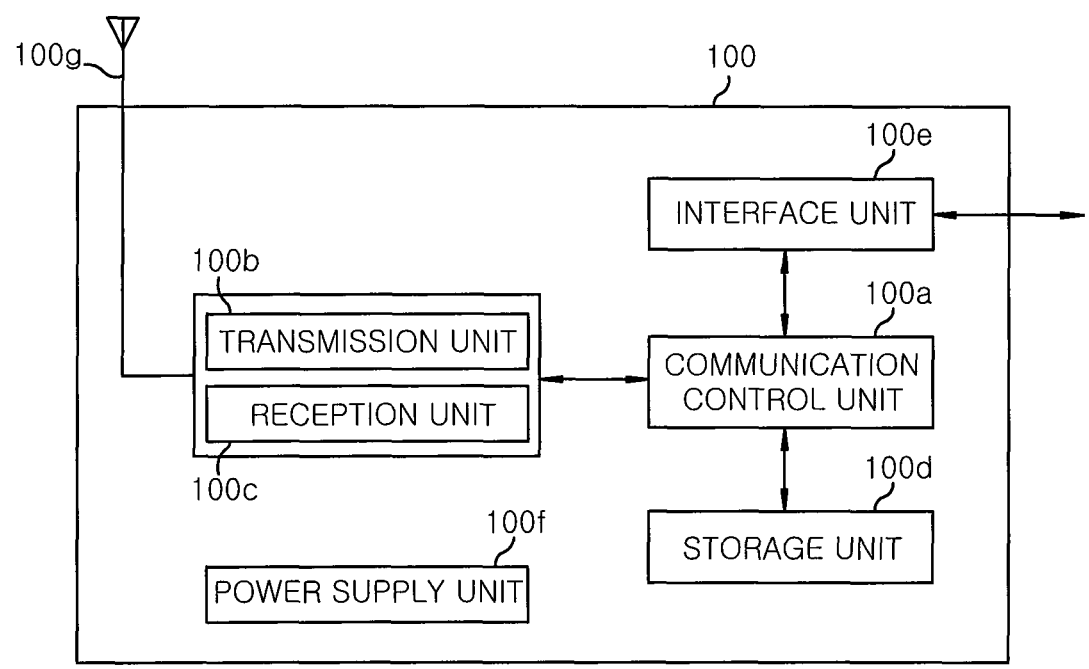
FIG. 2 is a block diagram of a wireless apparatus.

FIG. 2 is a block diagram of a wireless apparatus 100. Each of the wireless apparatuses A to H shown in FIG. 1 has a configuration shown in FIG. 2.

The wireless apparatus 100 includes a communication control unit 100a, a transmission unit 100b, a reception unit 100c, a storage unit 100d, an interface unit 100e, a power supply unit 100f, and an antenna unit 100g.

The communication control unit 100a is configured to have, e.g., a central processing unit, and perform a process of creating a message packet, a process of reading out a header of the received message packet and transferring the message packet in accordance with circumstances, a process of generating (or updating) a transfer table, or the like.

The transmission unit 100b and the reception unit 100c are configured as, e.g., ICs (Integrated Circuits). Further, the transmission unit 100b and the reception unit 100c may be formed as a single IC. In that case, the IC has a modulator, a power amplifier, a high frequency amplifier and a demodulator which are formed as one unit.

The transmission unit 100b transmits a message packet from the communication control unit 100a to another wireless apparatus.

The reception unit 100c receives a message packet from another wireless apparatus and transmits the message packet to the communication control unit 100a.

The storage unit 100d includes a ROM (Read Only Memory), a RAM (Random Access Memory), or the like. The storage unit 100d stores various programs executed by the communication control unit 100a, or various tables used by the communication control unit 100a to determine a transmission destination (or transfer destination) of the message packet. The various tables will be described later.

Further, the storage unit 100d serves as a work area used by the communication control unit 100a to perform various processes.

The interface unit 100e receives information to be transmitted to another wireless apparatus from an external device. The interface unit 100e employs, e.g., RS232C start-stop synchronous serial communication.

The power supply unit 100f supplies power to the respective components of the wireless apparatus 100 (e.g., the communication control unit 100a, the transmission unit 100b, the reception unit 100c, the storage unit 100d, the interface unit 100e, the antenna unit 100g and the like). The power supply unit 100f is, e.g., a lithium-ion battery, a dry battery, or the like.

In the following embodiment, an example in which a wireless apparatus A is wire-connected to a device 1 will be described. The device 1 is a device having no wireless function, e.g., a measurement device such as a thermometer, a pressure gauge, a flowmeter or the like, a control device for outputting anything.

Similarly to the case of the wireless apparatus A, a device 2 is wire-connected to a wireless apparatus B; a device 3 is wire-connected to a wireless apparatus C; a device 4 is wire-connected to a wireless apparatus D; and a device 5 is wire-connected to a wireless apparatus E. In this manner, any device is wire-connected to the other wireless apparatuses.

The wireless mesh network may include a wireless apparatus that performs only a transfer process without being connected to a device, or a wireless apparatus that is wire-connected to two or more devices.

2. Packet Structure

Hereinafter, a packet flowing on a wireless mesh network in the present embodiment will be described with reference to FIGS. 3A and 3B.

Hereinafter, an acknowledgement packet will be referred to as an Ack packet.

2-1. Message Packet

Figure 3A:
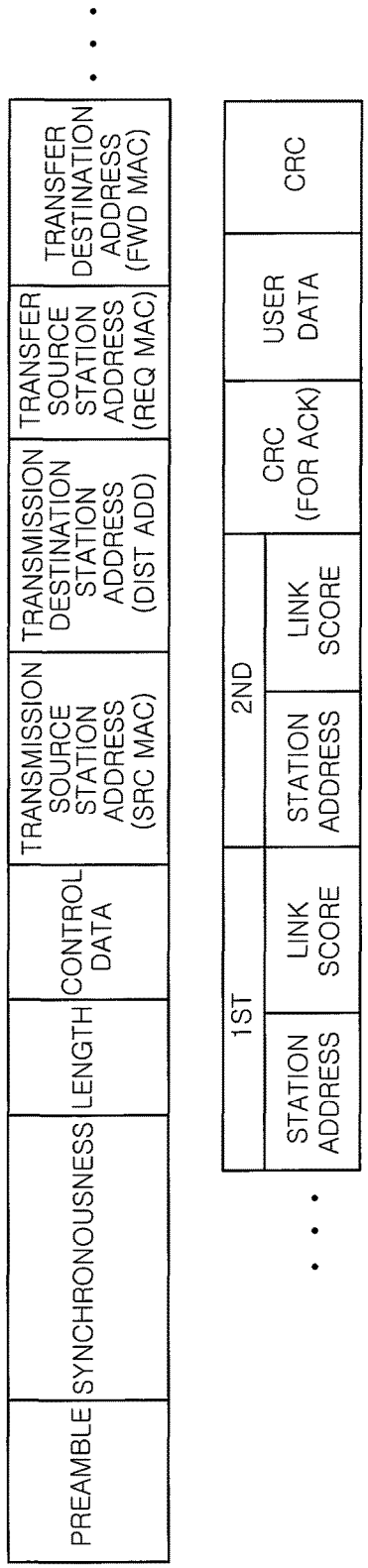
FIGS. 3A and 3B show a structure of a message packet and an acknowledgement packet.

FIG. 3A shows a structure of a message packet including user data.

The message packet has areas including user data (information that a user wants to transmit) and is transmitted from a wireless apparatus of a transmission source to a device of a transmission destination (e.g., measurement device or the like) after repetitive transmission/transfer.

A preamble area defines a start portion of data. A synchronous area stores data for synchronizing wireless apparatuses. A length area defines a length of data. A control data area stores data for specifying types of packets, packet numbers, frequency numbers, or the like.

A transmission source station address area stores a MAC (Media Access Control) address for specifying a wireless apparatus of a transmission source. A destination address area stores an address for specifying a device of a transmission destination.

In the following description, there will be described an example in which various devices such as the measurement device and the like are wire-connected to one of the wireless apparatuses as described above. A destination address is used for specifying a device to which information will be transmitted among various devices.

A transfer source station address area stores a MAC address for specifying a wireless apparatus of a transfer source. When a wireless apparatus transfers a received message packet to another wireless apparatus, a MAC address of the transferring wireless apparatus is stored in the transfer source station address area.

A transfer destination station address area stores a MAC address for specifying a wireless apparatus of a transfer destination. When the unicast communication in which the transfer destination is determined takes place, the MAC address of the wireless apparatus of the transfer destination is stored in the transfer destination station address area. When the broadcast communication in which the transfer destination is not determined takes place, the information indicating that the transfer is not intended for a specific wireless apparatus (e.g., information in which all bits are set to zero) is stored in the transfer destination station address area.

A first priority area stores first priority information of the address basis status of the wireless apparatus of the transfer source. A second priority area stores second priority information of the address basis status of the wireless apparatus of the transfer source.

This will be described in detail later. The address basis status stores information on a wireless apparatus from which a message packet is to be received for each final transmission destination (address of a device to which the user data is desired to be finally sent). Specifically, when the message packet is transferred from the wireless apparatus A to the wireless apparatus B and then finally transmitted to the device 2 wire-connected to the wireless apparatus B, the information indicating that the wireless apparatus A is to receive the message packet from the wireless apparatus X is stored in the address basis status. In this case, the wireless apparatus A notifies the neighboring wireless apparatuses including the wireless apparatus B of the address basis status by sending the message packet in which the MAC address of the wireless apparatus X is stored in the first priority area to the wireless apparatus B. The wireless apparatus X notified of the address basis status recognizes that the message packet is to be transferred to the wireless apparatus A under a specific condition (i.e., in the case of sending the message packet to the device 1).

The first priority area and the second priority area store a link score together with the MAC address. The link score expresses the communication environment between wireless apparatuses as a numerical value. For example, a higher score represents better communication environment. The link score is calculated by using a signal intensity, an error ratio, the number of hops and the like.

In the following description, the first priority area and the second priority area are collectively referred to as "address basis status area". The first priority area is simply referred to as "first area". The second priority area is simply referred to as "second area".

A CRC (Cyclic Redundancy Check) area for Ack stores a redundancy code for detecting an error from the length area, except the preamble area and the synchronous area, to the second priority area. A user data area stores information that is desired to be transferred. A CRC area stores a redundancy code for detecting an error from the length area to the user data. Further, the CRC area may store a redundancy code for detecting only an error of the user data.

The CRC area for Ack or the CRC area may store a code using, e.g., BCC (Block Check Character), as an error detection code other than a CRC code. In other words, the type of the error check (error correction) may vary.

2-2. Acknowledgement Packet

Figure 3B:
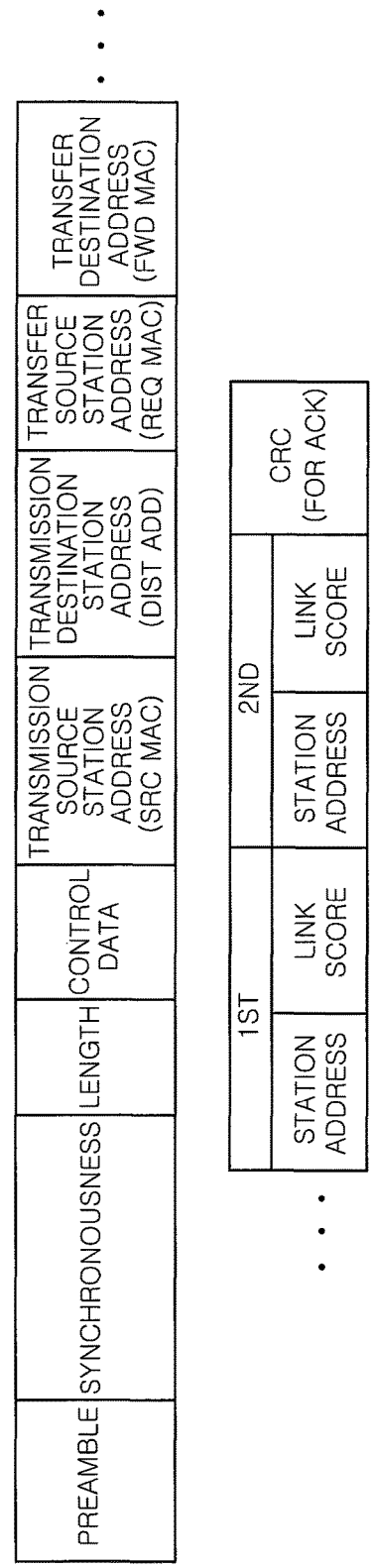

FIG. 3B shows a structure of an Ack packet that does not include user data.

The Ack packet is transmitted to other wireless apparatuses positioned within the communication range when a wireless apparatus wire-connected to a device as a final destination receives the message packet. The Ack packet notifies the neighboring wireless apparatuses of the arrival of the message packet. The Ack packet includes a preamble area, a synchronous area, a length area, a control data area, a transmission source station address area, a transmission destination address area, a transfer source station address area, a transfer destination station address area, a first priority area, a second priority area, and a CRC area for Ack. The respective areas are the same as those in the structure of the message packet. In other words, the Ack packet has a structure in which the user data area and the CRC area are omitted among the areas of the message packet.

3. Table 3-1. Address Basis Status

The address basis status will be described with reference to FIGS. 4A and 4B.

The address basis status stored in the storage unit 100d of the wireless apparatus 100 has records for the final transfer destinations of information (in this example, the devices 1, 2, 3, etc. respectively connected to the wireless apparatuses A, B, C, etc.).

As shown in FIG. 4A, in the address basis status of a wireless apparatus, when the device 1 is the final transmission destination, records indicating that the information is to be received from the wireless apparatus E firstly and then from the wireless apparatus C secondly are stored. Further, records in which the addresses of the devices 2 to 4 are linked with the information of a transfer station having the first priority and a transfer station having the second priority (transfer stations from which the information is to be received) are stored.

In the case of the device 5, only a first priority transfer station is linked. As such, depending on the arrangement status of the wireless apparatuses, only a first priority transfer station may be linked.

Since the address basis status is completed during management, both of first priority information and second priority information may not be determined during the generation.

When a wireless apparatus itself is included in the communication path having the first priority when sending the information to the final destination, the corresponding record is added to the address basis status.

On the other hand, when the wireless apparatus itself is not included in the communication path having the first priority when sending the information to the final destination, the record on the final destination is not generated. If generated, the record is deleted at the time when the transfer is deviated from the communication path having the first priority. The communication path having the first priority is determined by the link score between the wireless apparatuses.

In the following description, the address basis status is briefly expressed by omitting the link score and the like as shown in FIG. 4B (FIGS. 4A and 4B show the same address basis status).

Figure 5:
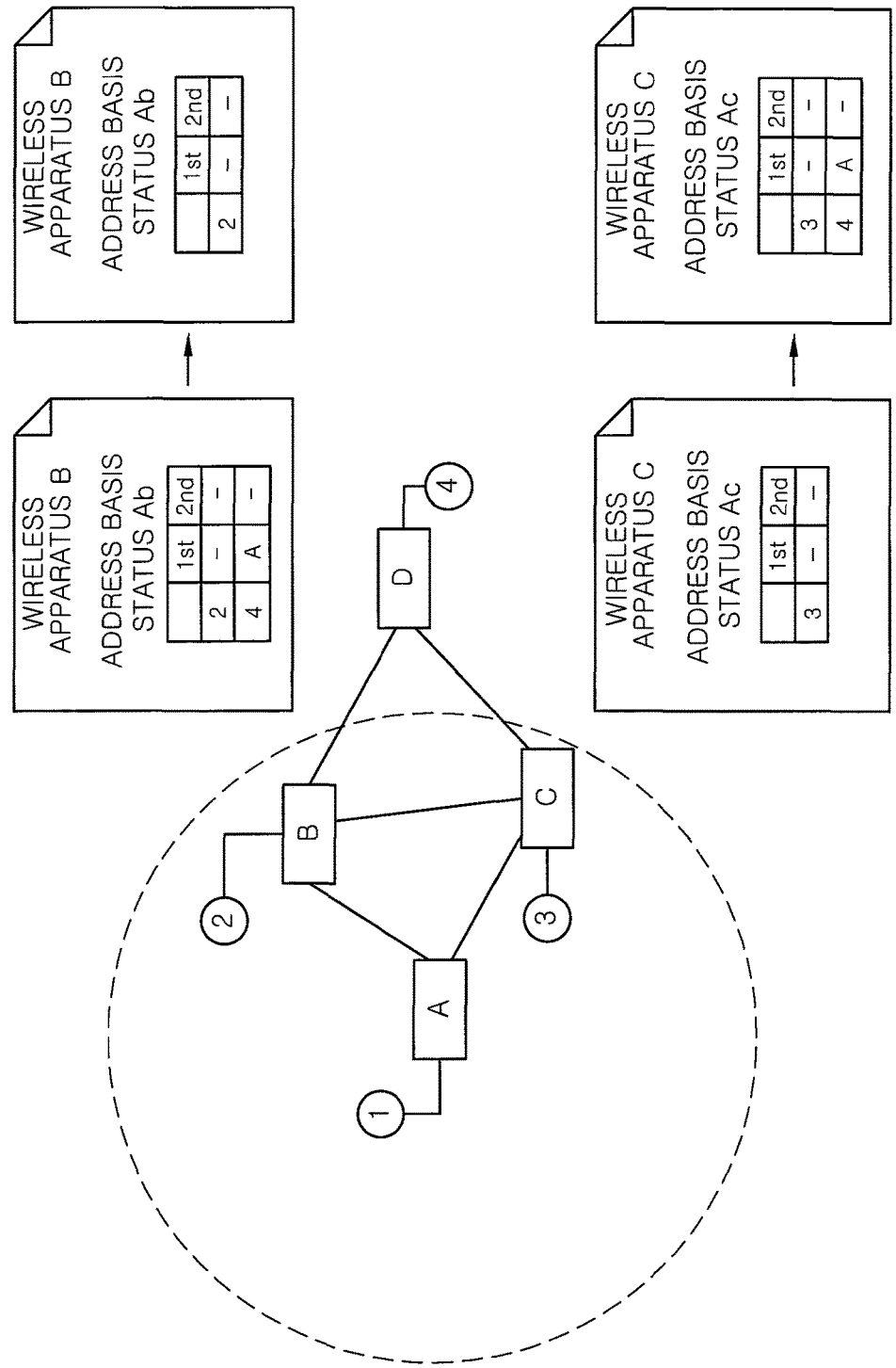
FIG. 5 shows an example of updating of the address basis status.

FIG. 5 shows updating of the address basis status. It will be described by using an example in which the device 1 is wire-connected to the wireless apparatus A; the device 2 is wire-connected to the wireless apparatus B; the device 3 is wire-connected to the wireless apparatus C; and the device 4 is wire-connected to the wireless apparatus D as shown in FIG. 5.

In FIG. 5, the communication range of the wireless apparatus A is expressed by a broken line. The wireless apparatuses B and C are positioned within the communication range of the wireless apparatus A, and the wireless apparatus D is positioned outside the communication distance. In other words, in order to transmit information from the wireless apparatus A to the device 4 connected to the wireless apparatus D, the information is to be transmitted via the wireless apparatuses B or C.

There are two communication paths of the information from the wireless apparatus A to the device 4. When the communication path "the wireless apparatus A→the wireless apparatus B→the wireless apparatus D" has higher priority than that of the communication path "the wireless apparatus A→the wireless apparatus C→the wireless apparatus D", the records for the device 4 are stored in the address basis status Ab of the wireless apparatus B. In other words, when the device 4 is the final transmission destination, the information on the wireless apparatus from which the information is to be received (the wireless apparatus A in this example) is stored.

FIG. 5 shows the case in which a wireless apparatus having the second priority, from which the wireless apparatus B is to receive information, does not exist when the device 4 is the final transmission destination.

It is assumed that the communication state between the wireless apparatuses B and D is deteriorated to reduce the link score. In this case, the communication path having the priority when transmitting the information from the wireless apparatus A to the device 4 becomes "the wireless apparatus A→the wireless apparatus C→the wireless apparatus D". At this time, the records for the device 4 is deleted from the address basis status Ab of the wireless apparatus B and, also, the records for the device 4 is added to the address basis status Ac of the wireless apparatus C. Accordingly, the communication using the communication path having the priority can be ensured while suppressing scaling up of a table size due to an increase in the number of devices.

A specific generation process of the address basis status will be described later.

3-2. Transfer Table

The transfer table will be described with reference to FIGS. 6A and 6B.

In the transfer table stored in the storage unit 100d of the wireless apparatus 100, records are created for each combination of a transmission source station address (address of a wireless apparatus from which the information is originally transmitted) and an address of a device of a transmission destination (address of a device as a final transmission destination).

Specifically, when the transmission source station address is the same but the transmission destination addresses are different, different records (record R1 and record R2 in the drawing) are stored as shown in FIG. 6A. When the transmission destination address is the same but the transmission source station addresses are different, different records (records R2, R3 and R4 in the drawing) are recorded.

In the following description, the transfer table is expressed by simplifying names and the like as shown in FIG. 6B (FIG. 6A and FIG. 6B show the same transfer table).

An example of updating of the transfer table will be described with reference to FIG. 7.

Figure 7:
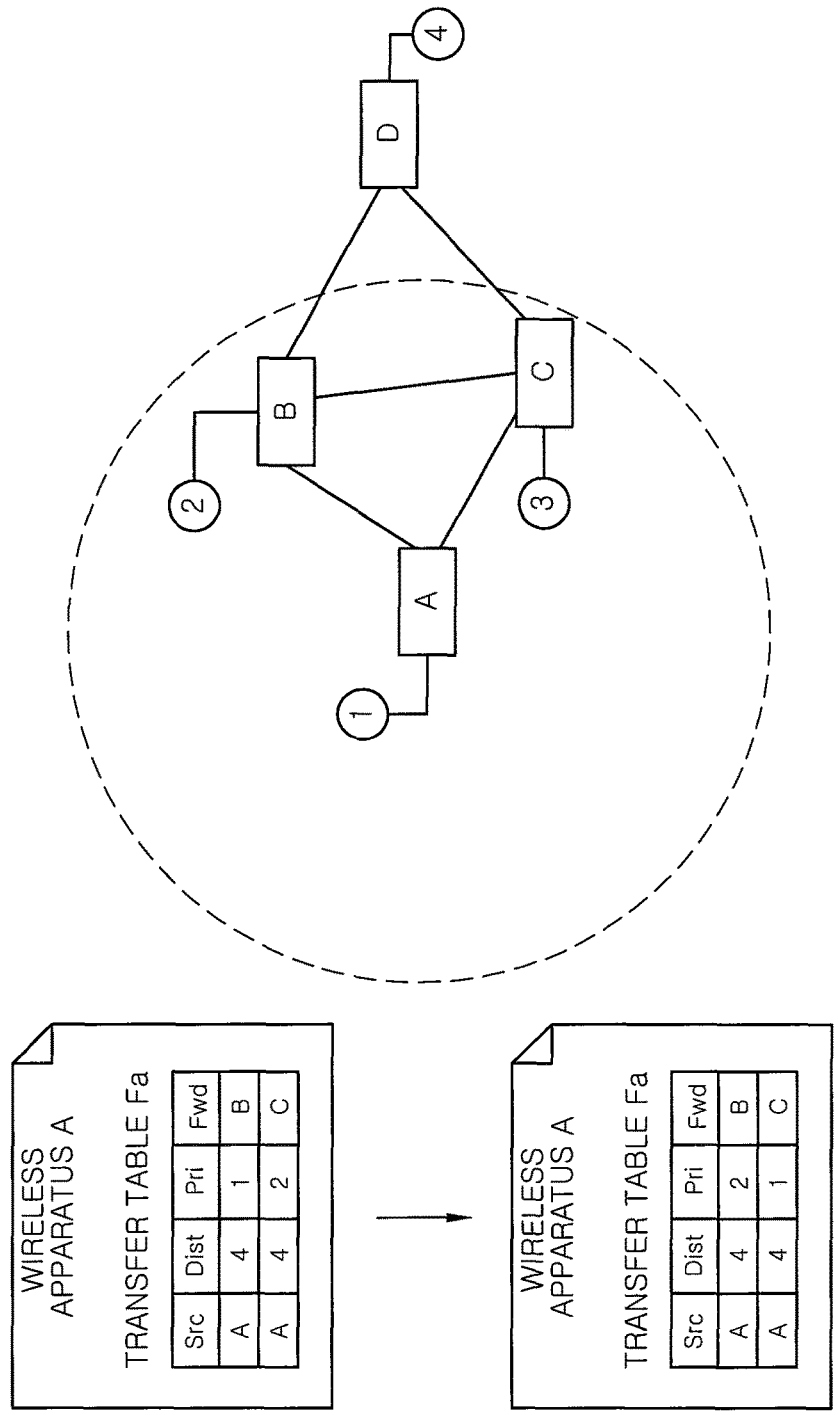
FIG. 7 shows an example of updating of the transfer table.

FIG. 7 shows an example in which the device 1 is wire-connected to the wireless apparatus A; the device 2 is wire-connected to the wireless apparatus B; the device 3 is wire-connected to the wireless apparatus C; and the device 4 is wire-connected to the wireless apparatus D. In FIG. 7, the communication range of the wireless apparatus A is expressed by a broken line. The wireless apparatuses B and C are positioned within the communication range of the wireless apparatus A, and the wireless apparatus D is positioned outside the communication distance. In order to transmit the information from the wireless apparatus A to the device 4, the information is to be transmitted via the wireless apparatus B or C.

It is assumed that the communication path through the wireless apparatus B has higher priority than that of the communication path through the wireless apparatus C. In this case, in the communication between the wireless apparatus A and the device 4, the information in which the wireless apparatus B is the first candidate for the transfer destination and the wireless apparatus C is the second candidate for the transfer destination is stored in the transfer table Fa of the wireless apparatus A. Similarly, although it is not illustrated, the information in which the wireless apparatus D is the first candidate for the transfer destination is stored in the transfer table Fb of the wireless apparatus B.

Then, it is assumed that the communication state between the wireless apparatuses B and D is deteriorated due to a certain reason to reduce the link score. In this case, in the communication between the wireless apparatus A and the device 4, the information in which the wireless apparatus C is the first candidate for the transfer destination and the wireless apparatus B is the second candidate for the transfer destination is stored in the transfer table Fa of the wireless apparatus A. A specific process of creating the transfer table will be described later.

4. Exemplary Processes of Creating the Address Basis Status and the Transfer Table The processes of creating and updating the records of the address basis status and the transfer table will be described with reference to FIGS. 8 to 34.

Figure 8:
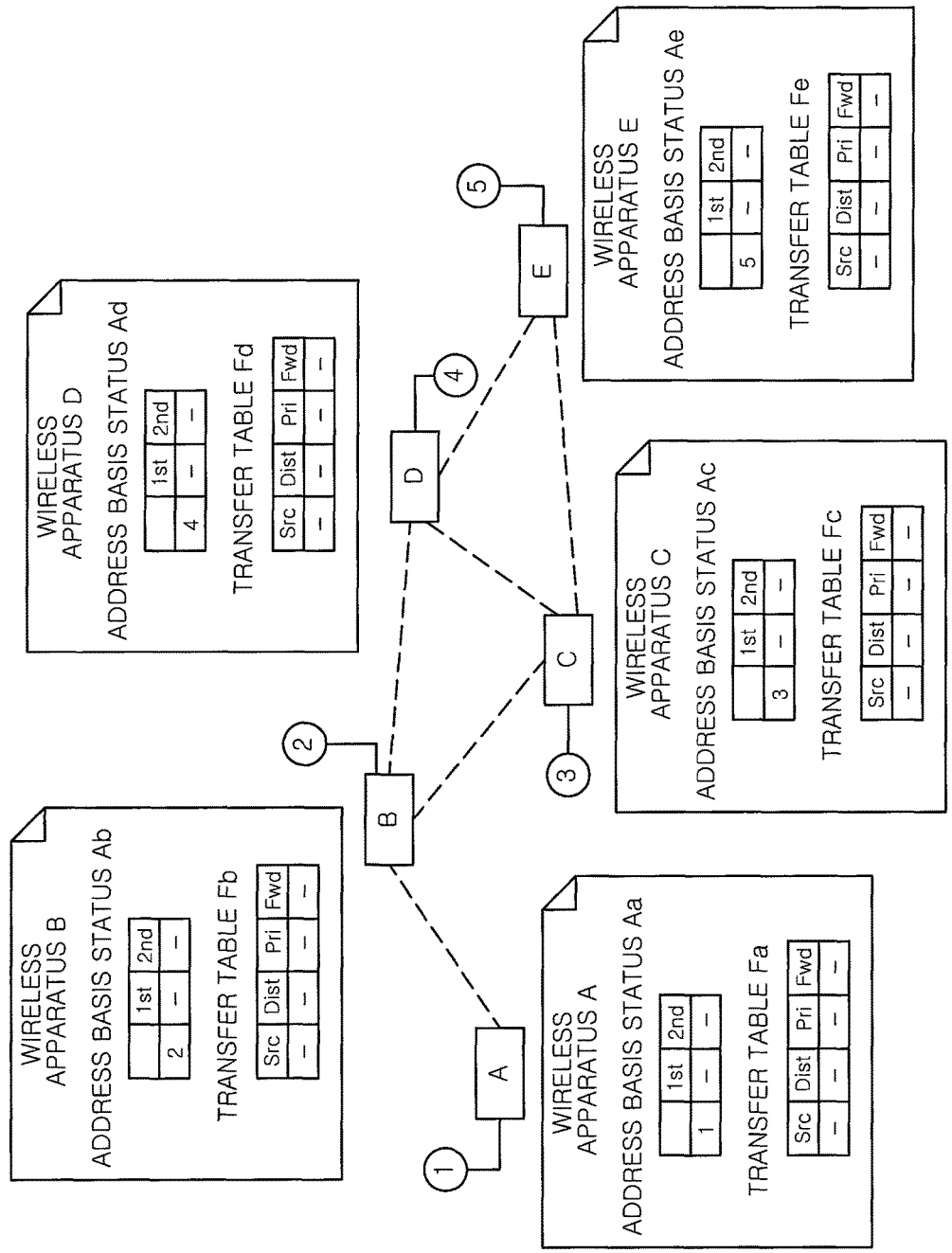
FIG. 8 shows an exemplary configuration of a wireless mesh network.

FIG. 8 shows an arrangement example of the wireless apparatuses.

Five wireless apparatuses A to E are arranged as shown in FIG. 8. In FIG. 8, the wireless apparatuses that can communicate with each other directly are connected by dashed lines. In other words, the wireless apparatus B is positioned within the communication range of the wireless apparatus A. The wireless apparatuses A, C and D are positioned within the communication range of the wireless apparatus B. The wireless apparatuses B, D and E are positioned within the communication range of the wireless apparatus C. The wireless apparatuses B, C and E are positioned within the communication range of the wireless apparatus D. The wireless apparatuses C and D are positioned within the communication range of the wireless apparatus E.

The wireless apparatuses A to E are wire-connected to the devices 1 to 5, respectively.

The records for the devices 1 to 5 are stored in the address basis status Aa, Ab, Ac, Ad, Ae of the wireless apparatuses A to E wire-connected to the devices 1 to 5. However, the positional relationship of the wireless apparatuses A to E is not known and, thus, the information on the first priority area and the second priority area of each record are undetermined. Further, no record is stored in the transfer tables Fa, Fb, Fc, Fd, Fe of the wireless apparatuses A to E.

An example in which polling is performed from the wireless apparatus A to the device 5 three times in a state shown in FIG. 8 will be described. In the present embodiment, three types of communications, i.e., communication from a transmission source device to a transfer device, communication from a transfer device to a transfer device, and communication from a transfer device to a transmission destination device, take place. The communication for performing the polling from the wireless apparatus A to the device 5 includes all of the three types of communications.

The tables are completed during transmission/reception of the message packet including the user data without transmission of a dedicated packet for discovering a communication path.

First, the communication performed until the first polling is performed and reply thereto returns will be described with reference to FIGS. 9 to 18.

Figure 9:
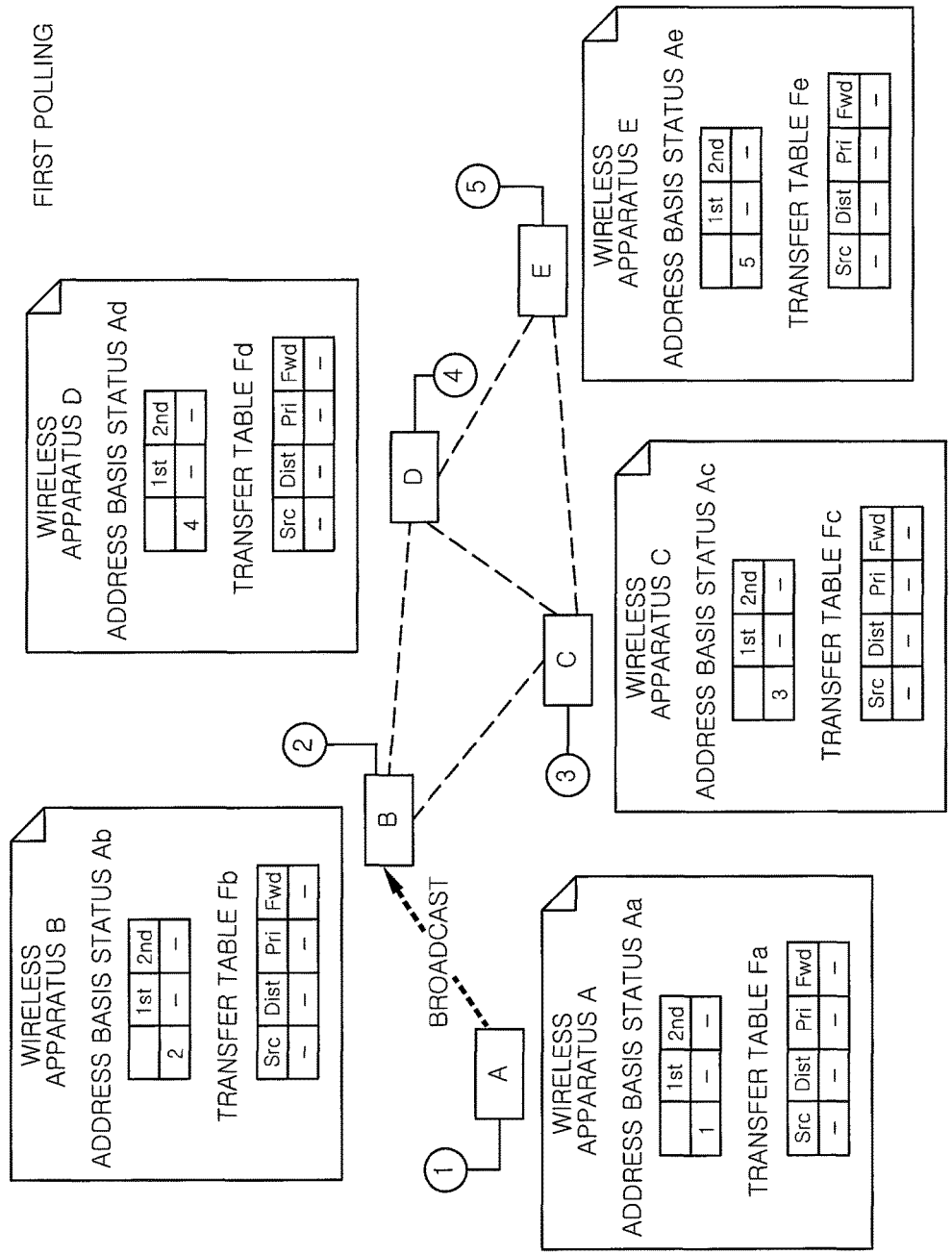
FIGS. 9 to 13 show flows of a message packet in the case of first polling.

As shown in FIG. 9, the device 1 requests the wireless apparatus A to transmit the information for polling the device 5 (e.g., information including instruction of acquiring and sending monitoring data). In response thereto, the wireless apparatus A generates a message packet and transmits the generated message packet. At this time, a wireless apparatus, to which the wireless apparatus A is to transfer the message packet to be transmitted to the device 5, is determined based on the transfer table Fa. Since, however, the information is not yet stored in the transfer table Fa, the message packet is transmitted to the respective wireless apparatuses positioned within the communication range by performing the broadcast communication (see FIG. 9).

In the transmission source station address area of the transmitted message packet, the information of the wireless apparatus A is stored. In the transmission destination address area, the information of the device 5 is stored. Such information is not changed in subsequent transfer processes.

In the transfer source station address area, the information of the wireless apparatus A is stored. In the transfer destination station address area, the information indicating no correspondence is stored.

In the address basis status area (the first priority area and the second priority area in FIG. 3), the records for the device 5 in the address basis status Aa of the wireless apparatus A are stored. At this timing, however, the corresponding record does not exist in the address basis status Aa of the wireless apparatus A and, thus, the information is not recorded in the corresponding area (i.e., the information indicating no correspondence is stored). Hereinafter, the storage of the information indicating no correspondence is referred to as "empty area".

Next, the wireless apparatus B that has received the message packet from the wireless apparatus A calculates the link score of the wireless apparatus A and updates the link score information on the wireless apparatus A in the address basis status Ab. Since, however, the records corresponding thereto do not exist in the address basis status Ab, i.e., the records for the device 5 do not exist, the address basis status Ab is not updated.

Figure 10:
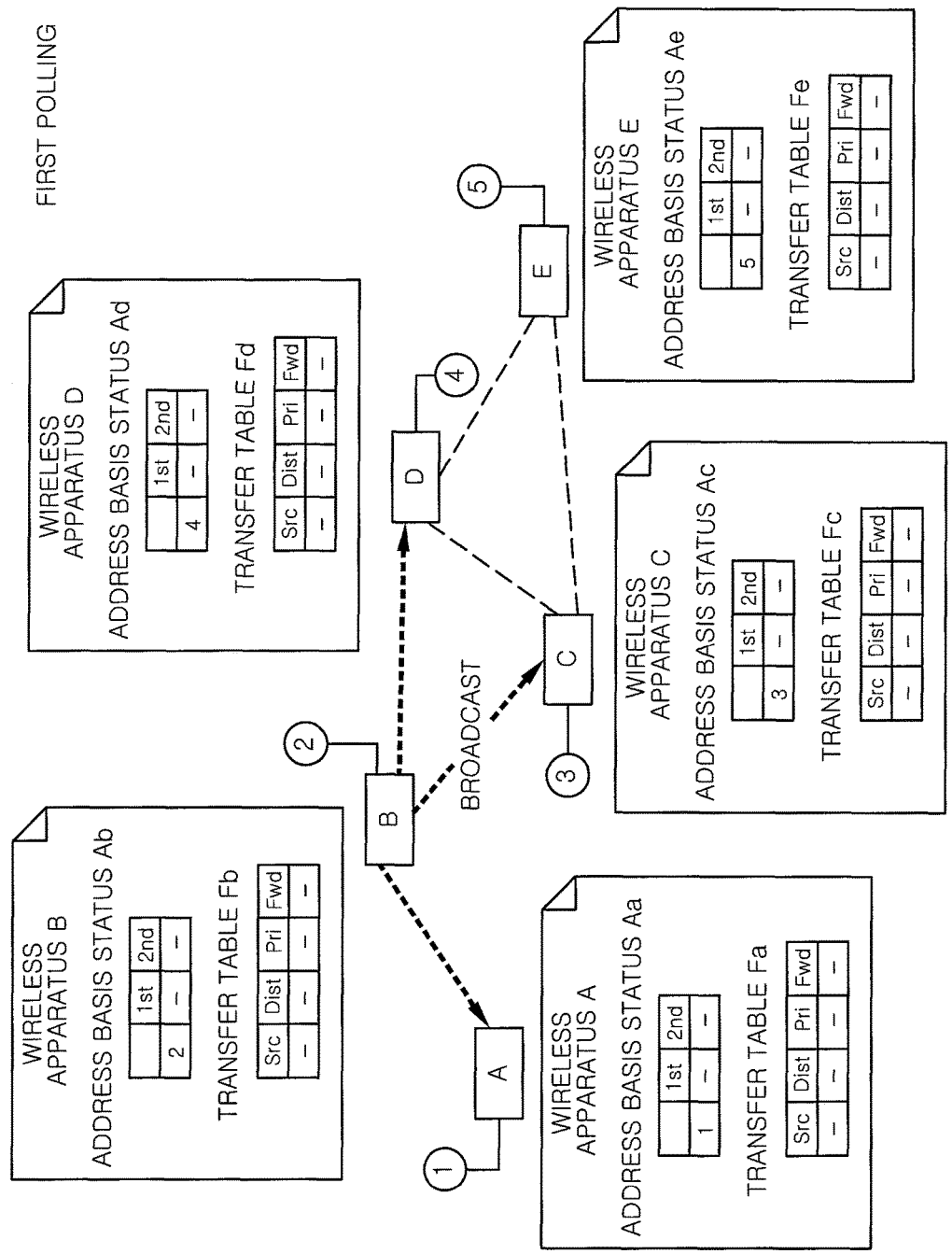

Next, the wireless apparatus B acquires the information of the transmission source station address area (wireless apparatus A) and the information of the transmission destination address area (device 5) by reading out the header of the message packet transmitted from the wireless apparatus A and checks whether or not the record corresponding thereto is stored in the transfer table Fb. At this timing, the corresponding record does not exist in the transfer table Fb of the wireless apparatus B and, thus, a wireless apparatus having the priority is not determined. Therefore, as shown in FIG. 10, the transfer operation is performed by broadcast communication after a random wait time elapses. The random wait time is longer than a minimum wait time, i.e., fixed wait time, including a transfer operation time of the transfer station having the first priority and a transfer operation time of the transfer station having the second priority.

In the transfer source station address area of the message packet transferred from the wireless apparatus B, the information of the wireless apparatus B is stored. The transfer destination station address area and the address basis status region are empty. In this communication, the message packet is received by the wireless apparatuses C and D and also received by the wireless apparatus A.

The wireless apparatus A that has received the message packet from the wireless apparatus B reads out the header of the message packet and checks that the message packet is the same as that previously transmitted thereby and destroys the message packet. Further, when wireless apparatus A recognizes that it is the first priority transfer station or the second priority transfer station which is to transfer the message packet, the message packet transferred from the first priority transfer station or the second priority transfer station replaces the Ack packet. Hereinafter, this will be referred to as "proxy Ack packet". The proxy Ack packet is different from the Ack packet in that the user data is added.

The wireless apparatuses C and D that have received the message packet from the wireless apparatus B calculates the link score of the wireless apparatus B and updates the link score information on the wireless apparatus B in the address basis status Ac and Ad. Since, at this time, the corresponding records do not exist in the address basis status Ac and Ad, the link score information is not updated. The wireless apparatuses C and D read out the header of the message packet, thereby acquiring the information of the transmission source station address area (wireless apparatus A) and the information of the transmission destination address area (device 5) and checking whether or not the records corresponding thereto are stored in the transfer tables Fc and Fd.

Figure 11:
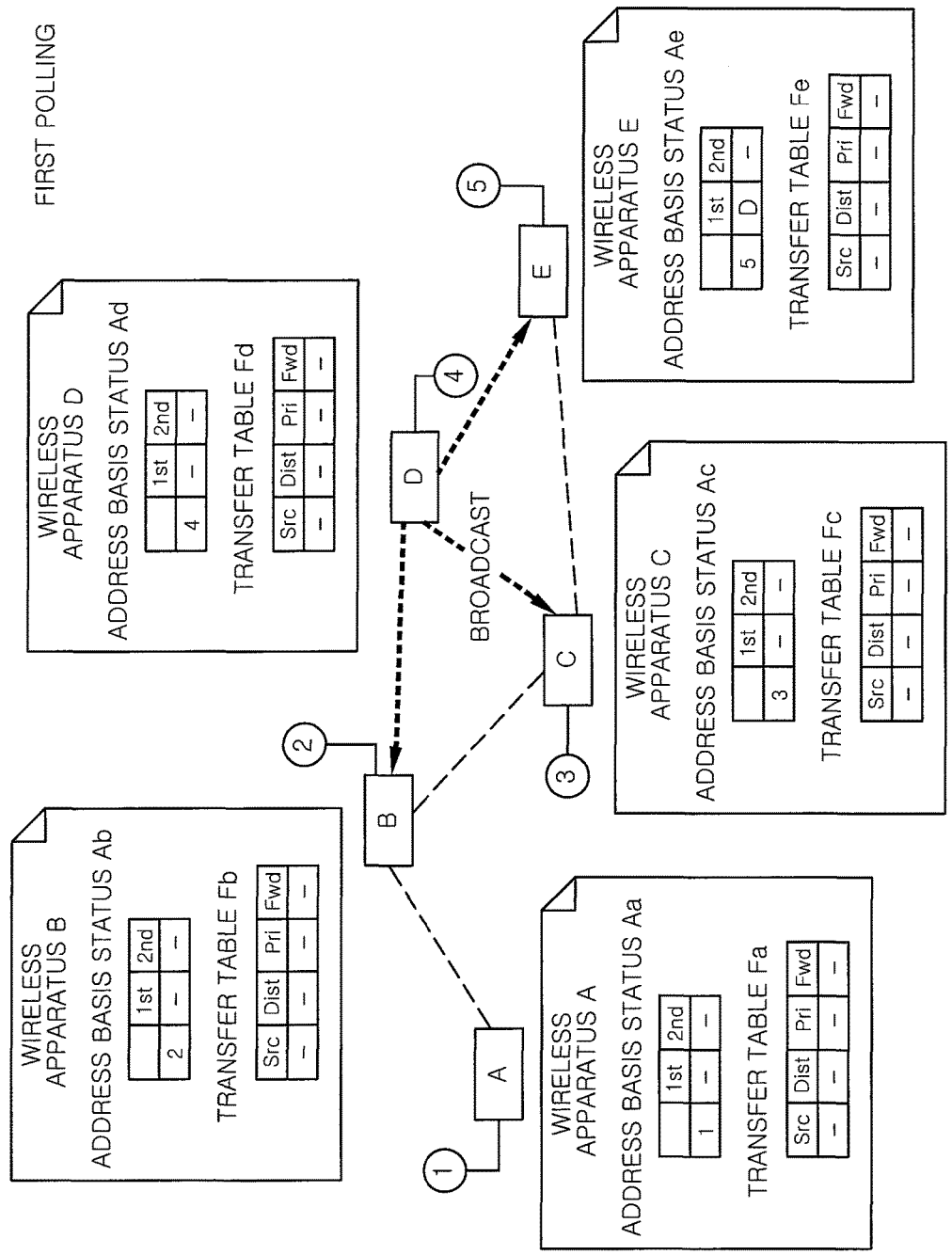

Since the records corresponding thereto are not stored in the transfer tables Fc and Fd at this time, the wireless apparatuses C and D perform transfer operations after respective random wait times elapse. On the assumption that the random wait time of the wireless apparatus D elapses first, the wireless apparatus D transfers the message packet to neighboring wireless apparatuses by performing broadcast communication as shown in FIG. 11. In the transfer source station address area of the message packet transmitted at this time, the information of the wireless apparatus D is stored. The transfer destination address area and the address basis status area are empty. The message packet is received by the wireless apparatus E and also received by the wireless apparatuses B and C.

The wireless apparatus B that has received the message packet from the wireless apparatus D checks that the message packet is the same as that previously transmitted thereby and destroys the message packet. The wireless apparatus C that has received the message packet from the wireless apparatus D checks that the message packet is the same as that previously transmitted from the wireless apparatus B and destroys the newly received message packet.

The wireless apparatus E that has received the message packet from the wireless apparatus D reads out the header of the message packet and recognizes that the message packet is for the device 5 wire-connected thereto. Therefore, the wireless apparatus E extracts the information of the user data area and transmits the extracted information to the device 5.

Further, the wireless apparatus E calculates the link score of the wireless apparatus D based on the received message packet and updates the address basis status Ae. The records for the device 5 exist in the address basis status Ae, so that the corresponding records are updated. Specifically, since the wireless device E receives the message packet to be transmitted to the device 5 from the wireless apparatus D, it checks whether or not the link score of the wireless apparatus D is higher than those of other wireless apparatuses. At this timing, the link score of the wireless apparatus D is highest because the message packet for the device 5 is firstly received. In other words, the MAC address of the wireless apparatus D is stored in the first area in the records for the device 5. The second area in the records for the device 5 is empty.

Figure 12:
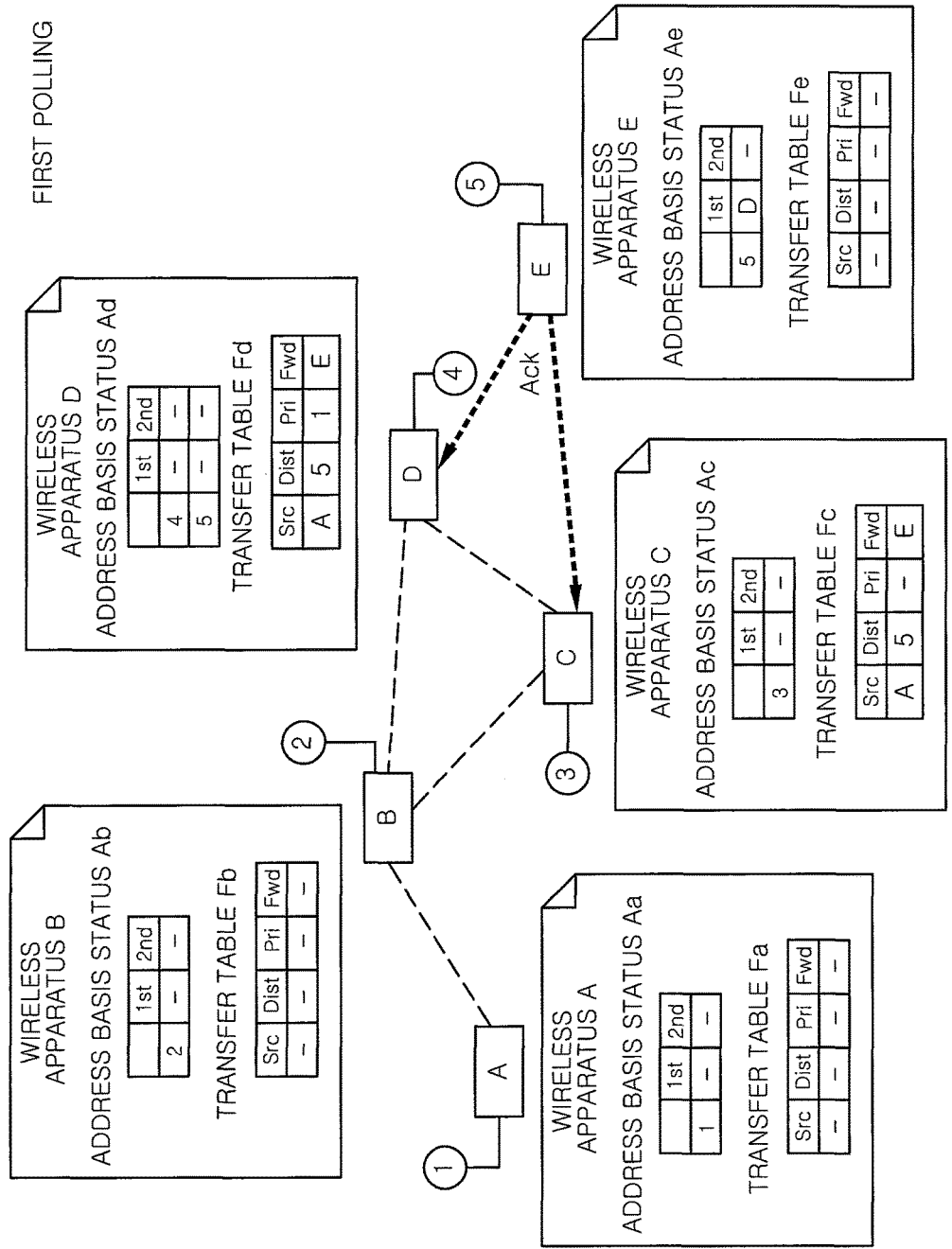

Next, as shown in FIG. 12, the wireless apparatus E transmits the Ack packet for the received message packet to neighboring wireless apparatuses. As described above, the Ack packet is a packet having no user data area and received by the wireless apparatuses C and D. In the transmission source station address area of the header of the Ack packet, the information of the wireless apparatus A is stored. In the transmission destination address area, the information of the device 5 is stored. In other words, the information same as that in the header of the previous message packet received by the wireless apparatus E is stored.

In the address basis status area of the Ack packet, the records for the device 5 in the address basis status Ae of the wireless apparatus E are stored. In other words, D is recorded in the first area and the second area is empty.

The wireless apparatus D that has received the Ack packet from the wireless apparatus E reads out the header.

At this time, it is recognized from the address basis status area of the header that the wireless apparatus E performs management such that the message packet for the device 5 is to be received from the wireless apparatus D. In other words, it is recognized that when the message packet for the device 5 is received, the wireless apparatus D has the first priority in transferring the message packet to the wireless apparatus E.

Therefore, new records are added to the transfer table Fd of the wireless apparatus D (see FIG. 12). These records are generated by using the information of the transmission source station address area (wireless apparatus A) of the header of the Ack packet and the information of the destination address area (device 5). Specifically, the records "Src: A, Dist: 5, Pri: 1(1st), Fwd: E" are generated.

It is recognized from "Pri: 1" that the wireless apparatus D is included in the communication path having the first priority in the case of sending the information to the final transmission destination as described above. Therefore, records for the device 5 are newly added to the address basis status Ad of the wireless apparatus D. Since, however, a wireless apparatus from which the wireless apparatus D receives the message packet for the device 5 is not known, the first area and the second area are empty.

The wireless apparatus C that has received the Ack packet from the wireless apparatus E reads out the header as in the case of the wireless apparatus D. At this time, the Ack packet can be directly received, so that the wireless apparatus C recognizes that the wireless apparatus E wire-connected to the device 5 as the final transmission destination of the message packet is within the communication range. In other words, it is recognized that the wireless apparatus C is a candidate for the wireless apparatus that transfers the message packet to the device 5.

Therefore, the wireless apparatus C acquires the information of the address basis status Ae of the wireless apparatus E from the header of the Ack packet and updates the transfer table Fc. Specifically, records "Src: A, Dist: 5, Pri: undetermined (or information other than 1st and 2nd), Fwd: E" are created.

In the wireless apparatus C, since "Pri" is not 1st, records for the device 5 are not created in the address basis status Ac.

The wireless apparatus that has received the Ack packet (except the proxy Ack packet) recognizes that the information has reached the final transmission destination (device 5 in this example). Therefore, the same message packet is not transferred. In other words, the wireless apparatus C that has received the Ack packet from the wireless apparatus E destroys the message packet received from the wireless apparatus B.

Figure 13:
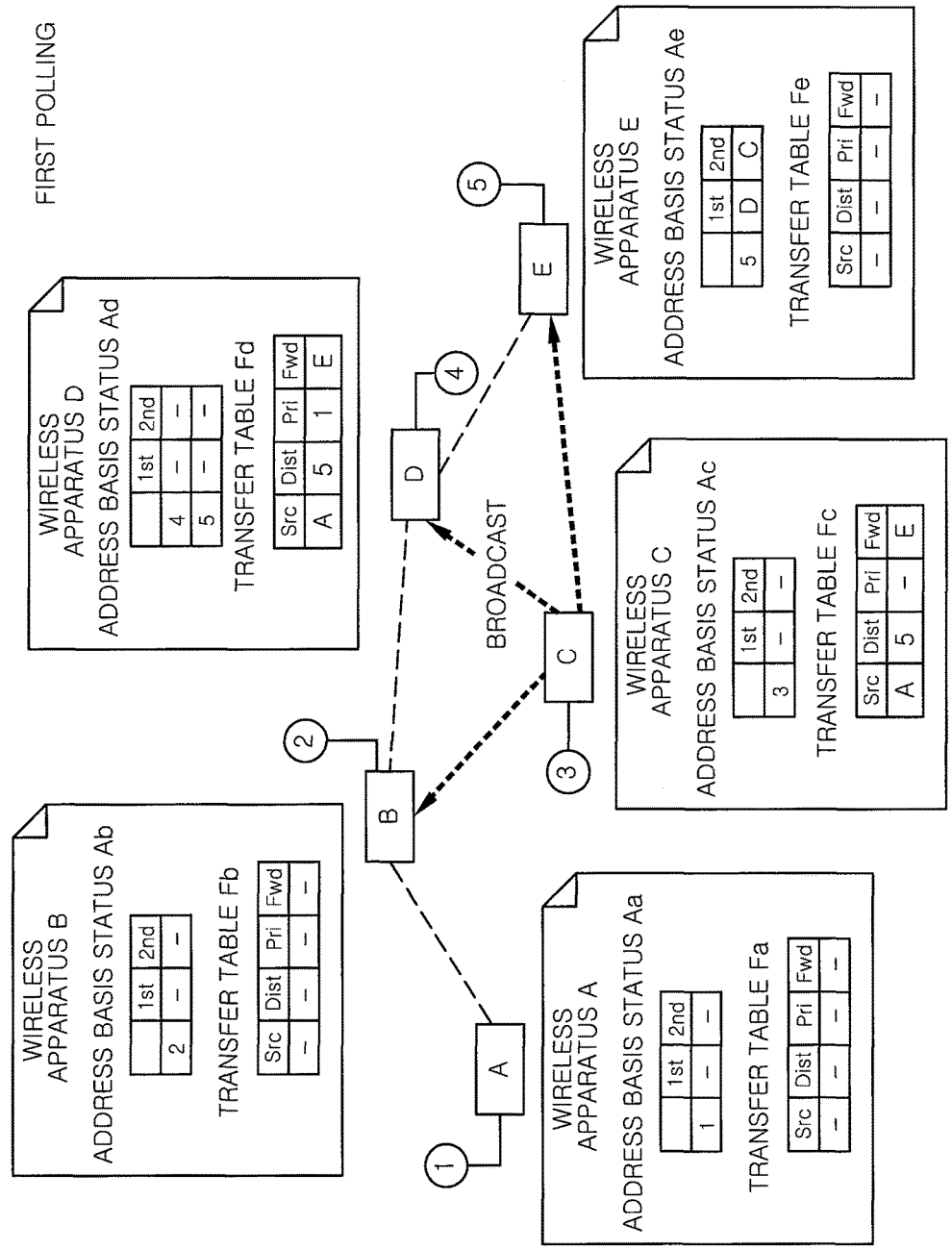

However, when the first area or the second area in the header of the Ack packet received from the wireless apparatus is undetermined, i.e., when the wireless apparatus C that has received the Ack packet from the wireless apparatus E as shown in FIG. 12 recognizes that the second area of the address basis status Ae of the wireless apparatus E is undetermined, the wireless apparatus C performs a transfer operation by using broadcast communication without destroying the message packet received from the wireless apparatus B as shown in FIG. 10 (see FIG. 13). In the transfer source station address area of the message packet transmitted at this time, the information of the wireless apparatus C is stored. The transfer destination address area and the address basis status area are empty. The message packet transmitted from the wireless apparatus C is received by the wireless apparatuses B, D and E.

The wireless apparatuses B and D that have received the message packet from the wireless apparatus C analyze the header of the message packet and destroy the message packet when the received message packet is the same as that previously transmitted from the wireless apparatuses B and D. Further, the wireless apparatuses B and D try to update the link score of the wireless apparatus C; however, the records corresponding thereto do not exist in the address basis status Ab and Ad of the wireless apparatuses B and D, and the updating process is not performed.

The wireless apparatus E that has received the message packet analyzes the header of the message packet, and after confirming that the message packet has been already received, the wireless apparatus E destroys the message packet. Further, the wireless apparatus E updates the link score of the wireless apparatus C. Since the second area of the records for the device 5 in the address basis status Ae is empty, the link score of the wireless apparatus C is compared with the previously acquired link score of the wireless apparatus D. The information is stored in the first area and the second area based on the link score. On the assumption that the link score between the wireless apparatus D and E is higher than the link score between the wireless apparatuses C and E, the information of the wireless apparatus D is stored (i.e., not rewritten) in the first area and the information of the wireless apparatus C is stored in the second area.

Next, a process in which the device 5 transmits polling data (sends a reply) will be described.

First, the wireless apparatus E that has been requested to transmit the polling data from the device 5 to the wireless apparatus A generates a message packet and transmits the generated message packet to another wireless apparatus. In the transmission source station address area of the header of the message packet, the information of the wireless apparatus E is stored. In the transfer destination address area, the information of the wireless apparatus A is stored. Such information is not changed in subsequent processes.

In the transfer source station address area, the information of the wireless apparatus E is stored. In the transfer destination station address area, the records for the device 1 in the address basis status Ae of the wireless apparatus E are stored. Since, however, the records for the device 1 do not exist in the address basis status Ae at this time, the transfer destination address area is empty.

Figure 14:
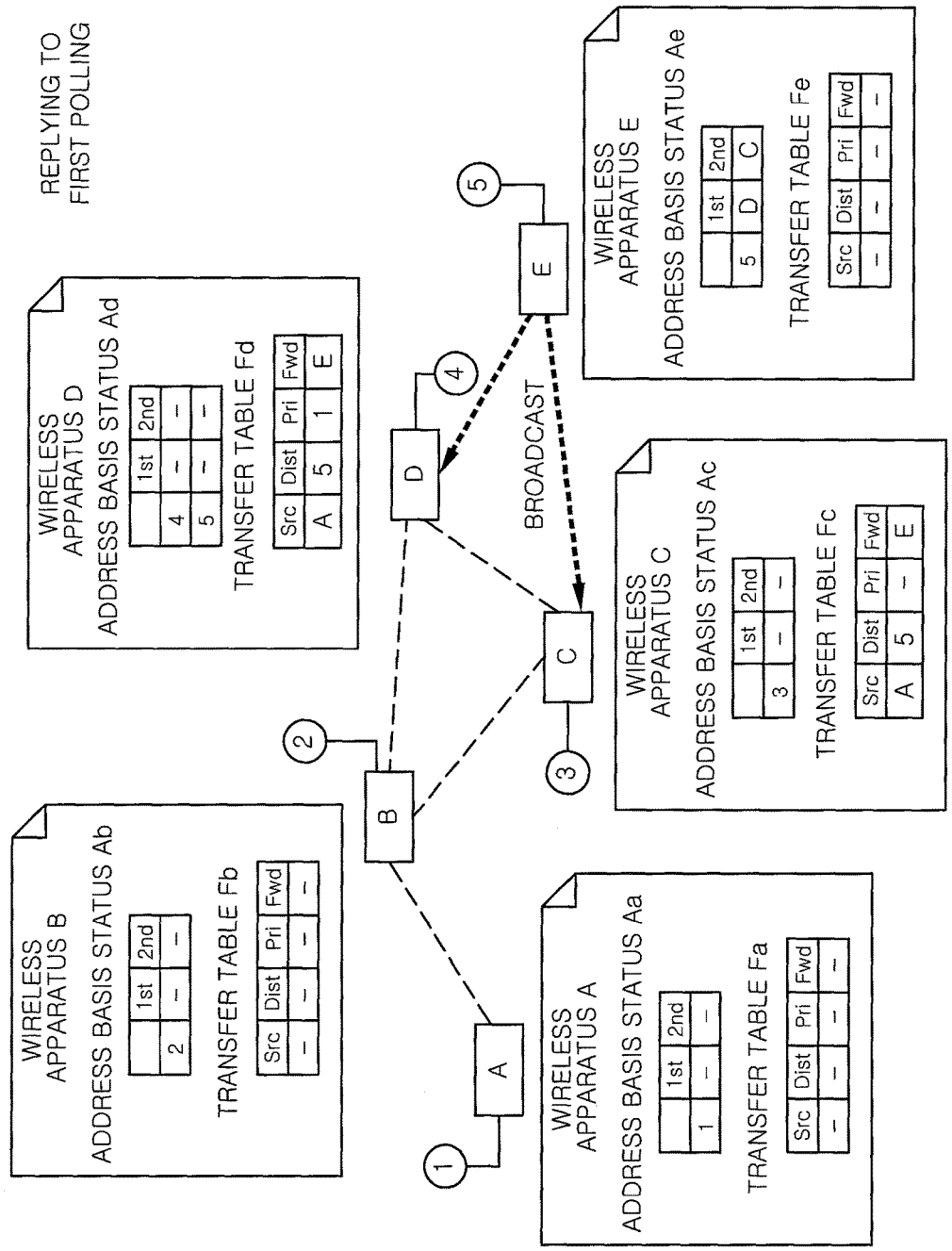
FIGS. 14 to 18 show flows of the message packet in the case of replying to the first polling.

The message packet from the wireless apparatus E is transmitted based on the information stored in the transfer table Fe. Since the records "Src: E, Dist: 1" do not exist at this time, the broadcast communication is performed as shown in FIG. 14.

The wireless apparatuses C and D that have received the message packet from the wireless apparatus E calculate the link score of the wireless apparatus E and try to update the link score information on the wireless apparatus E in the address basis status Ac and Ad. Since the records corresponding thereto do not exist in the address basis status Ac and Ad at this time, the updating process is not performed.

The wireless apparatuses C and D read out the header of the received message packet, thereby acquiring the information of the transmission source station address area (wireless apparatus E) and the information of the transmission destination address area (device 1) and checking whether the records corresponding thereto are stored in the transfer tables Fc and Fd.

Figure 15:
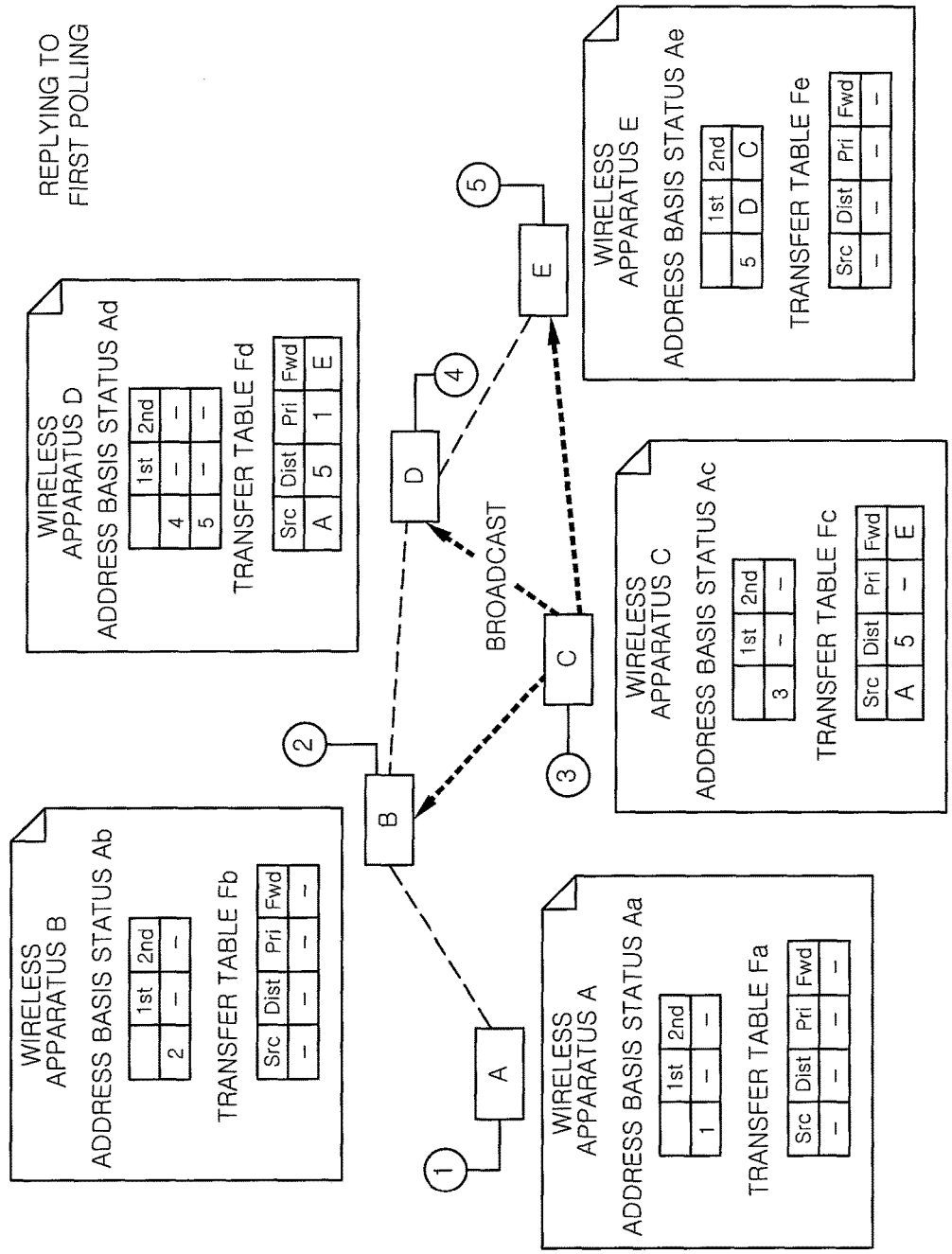

Since the records corresponding thereto are not stored in the transfer tables Fc and Fd at this time, the wireless apparatuses C and D perform transfer operations after respective random wait times elapse. On the assumption that the random wait time of the wireless apparatus C elapses first, the wireless apparatus C transfers the message packet to neighboring devices by performing broadcast communication as shown in FIG. 15. In the transfer source station address area of the message packet transferred at this time, the information of the wireless apparatus C is stored. The transfer destination address area and the address basis status area are empty. The message packet is received by the wireless apparatus B and also received by the wireless apparatuses D and E.

The wireless apparatus E that has received the message packet from the wireless apparatus C checks whether or not the message packet is the same as that previously transmitted from the wireless apparatus E and then destroys the message packet.

The wireless apparatus D that has received the message packet from the wireless apparatus C checks whether or not the message packet is the same as that previously transmitted from the wireless apparatus E and then destroys the message packet.

The wireless apparatus B that has received the message packet from the wireless apparatus C reads out the header of the message packet, thereby acquiring the information of the transmission source station address area (wireless apparatus E) and the information of the transmission destination address area (device 1) and checking whether or not the records corresponding thereto are stored in the transfer table Fb. At this time, the records corresponding thereto do not exist in the transfer table Fb of the wireless apparatus B and the wireless apparatus having the priority is not specified. Therefore, the random wait time is set and starts to elapse.

In this time, each of the random wait times of the wireless apparatuses B and D is elapsing. In this example, it is assumed that the random wait time of the wireless apparatus D elapses first.

Figure 16:
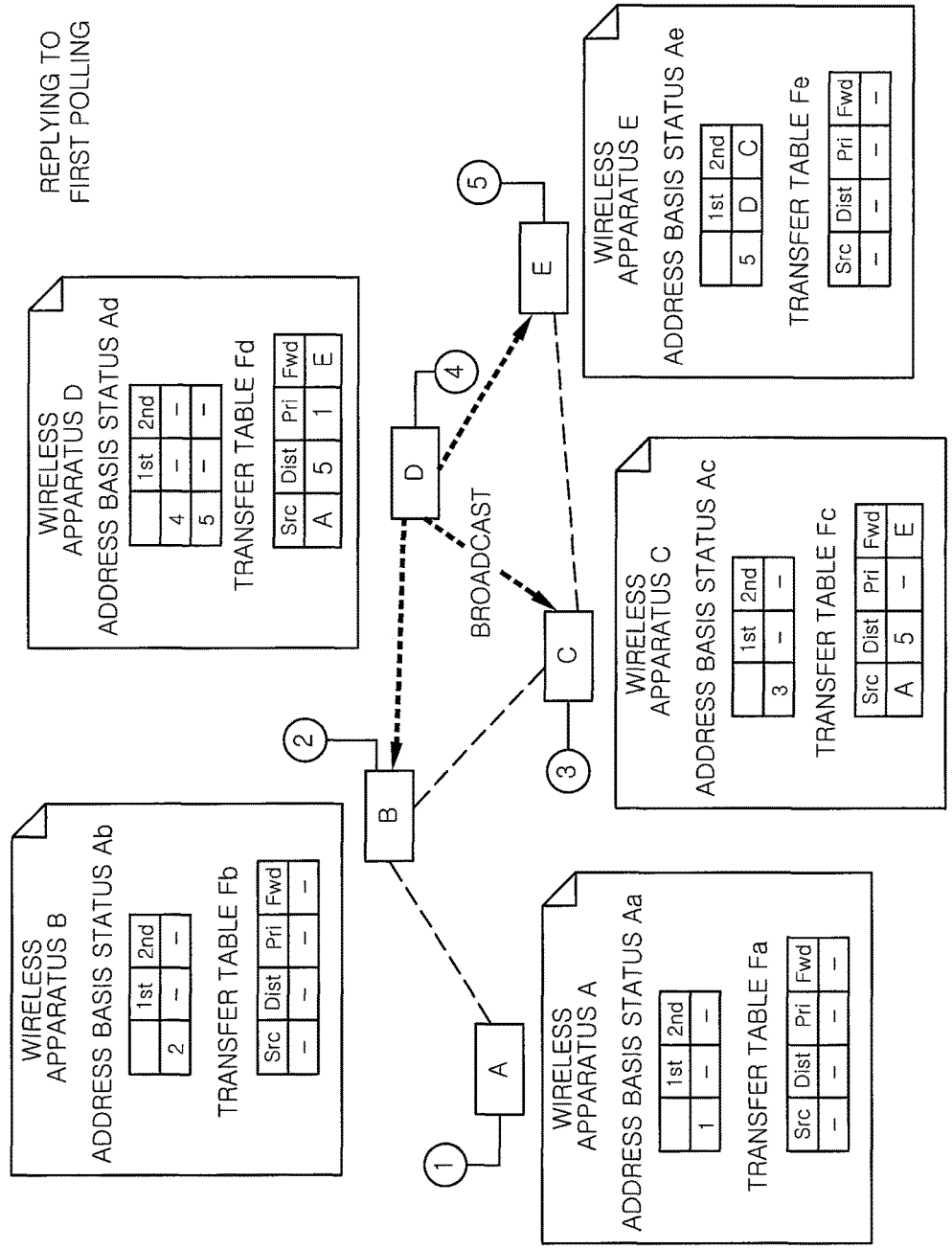

As shown in FIG. 16, the wireless apparatus D transfers the message packet by performing broadcast communication. In the transfer source station address area of the header of the message packet transmitted at this time, the information of the wireless apparatus D is stored. The transfer destination address area and the address basis status area are empty.

The wireless apparatuses B, C and E that have received the message packet from the wireless apparatus D check whether the message packet is the same as the already received message packet or the already transmitted (transferred) message packet and then destroy the received message packet.

The wireless apparatuses B, C and E calculate the link score of the wireless apparatus D and update the address basis status Ab, Ac and Ae. In the address basis status Ab and Ac, the records to be updated do not exist at this time, so that the updating process is not performed. On the other hand, in the address basis status Ae of the wireless apparatus E, the link score information of the wireless apparatus D is stored in the records for the device 5, so that this information is updated with new link score information.

Figure 17:
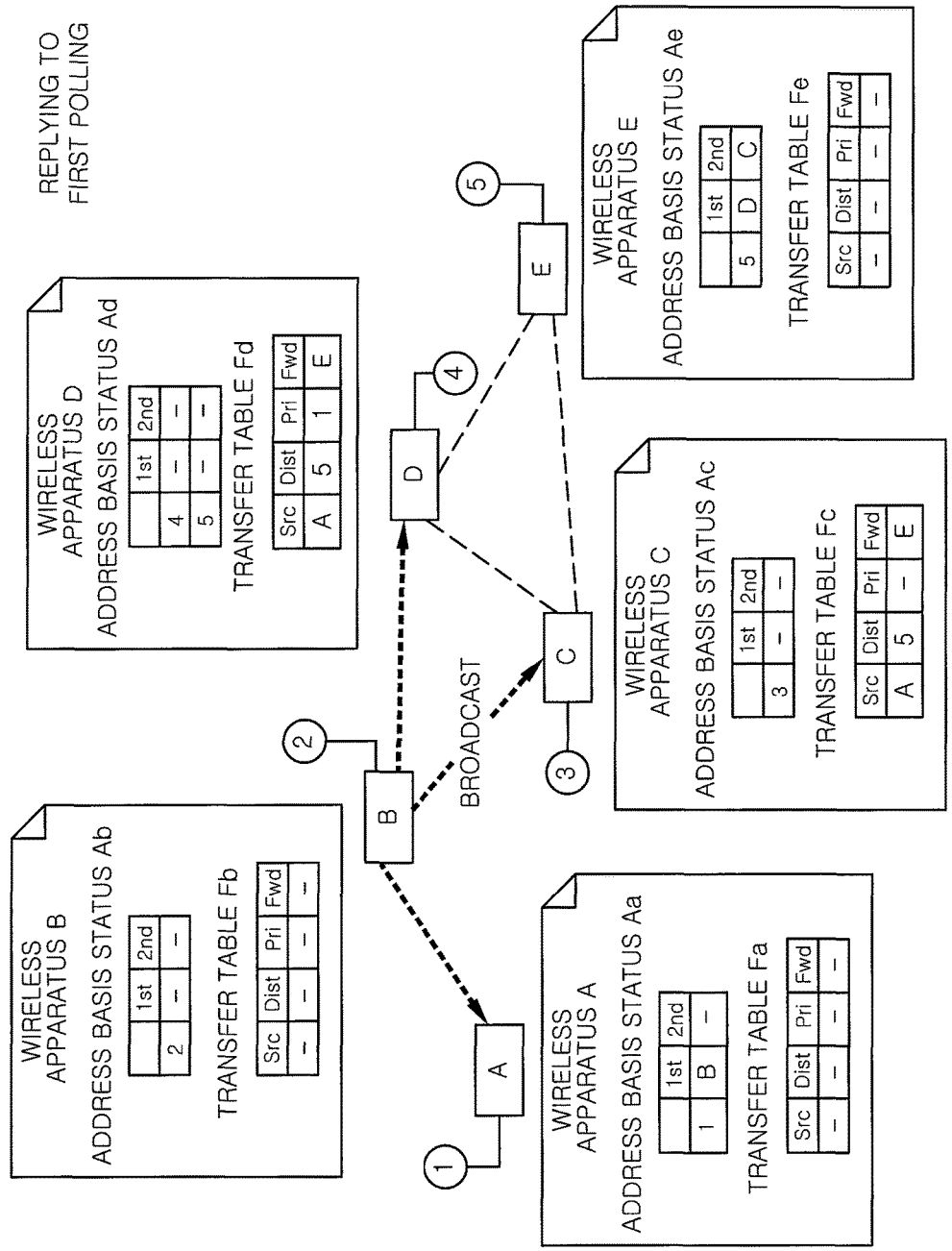

Next, the wireless apparatus B of which wait time has elapsed performs a transfer operation by using broadcast communication as shown in FIG. 17. In the transfer source station address area of the message packet, the information of the wireless apparatus B is stored. The transfer destination station address area and the address basis status area are empty.

The wireless apparatus D that has received the message packet from the wireless apparatus B checks that the message packet is the same as the already transmitted (transferred) message packet and then destroys the received message packet.

The wireless apparatus C that has received the message packet from the wireless apparatus B checks that the message packet is the same as the already transmitted message packet and then destroys the received message packet.

The wireless apparatus A that has received the message packet from the wireless apparatus B recognizes that the message packet is for the device 1 wire-connected thereto. The wireless apparatus A extracts the information of the user data area and transmits the extracted information to the device 1. Further, the wireless apparatus A calculates the link score of the wireless apparatus B based on the message packet and updates the address basis status Aa. Since the message packet for the device 1 has been firstly received at this time, the link score and the MAC address of the wireless apparatus B are stored in the first area. The second area in the records for the device 1 is still empty.

Figure 18:
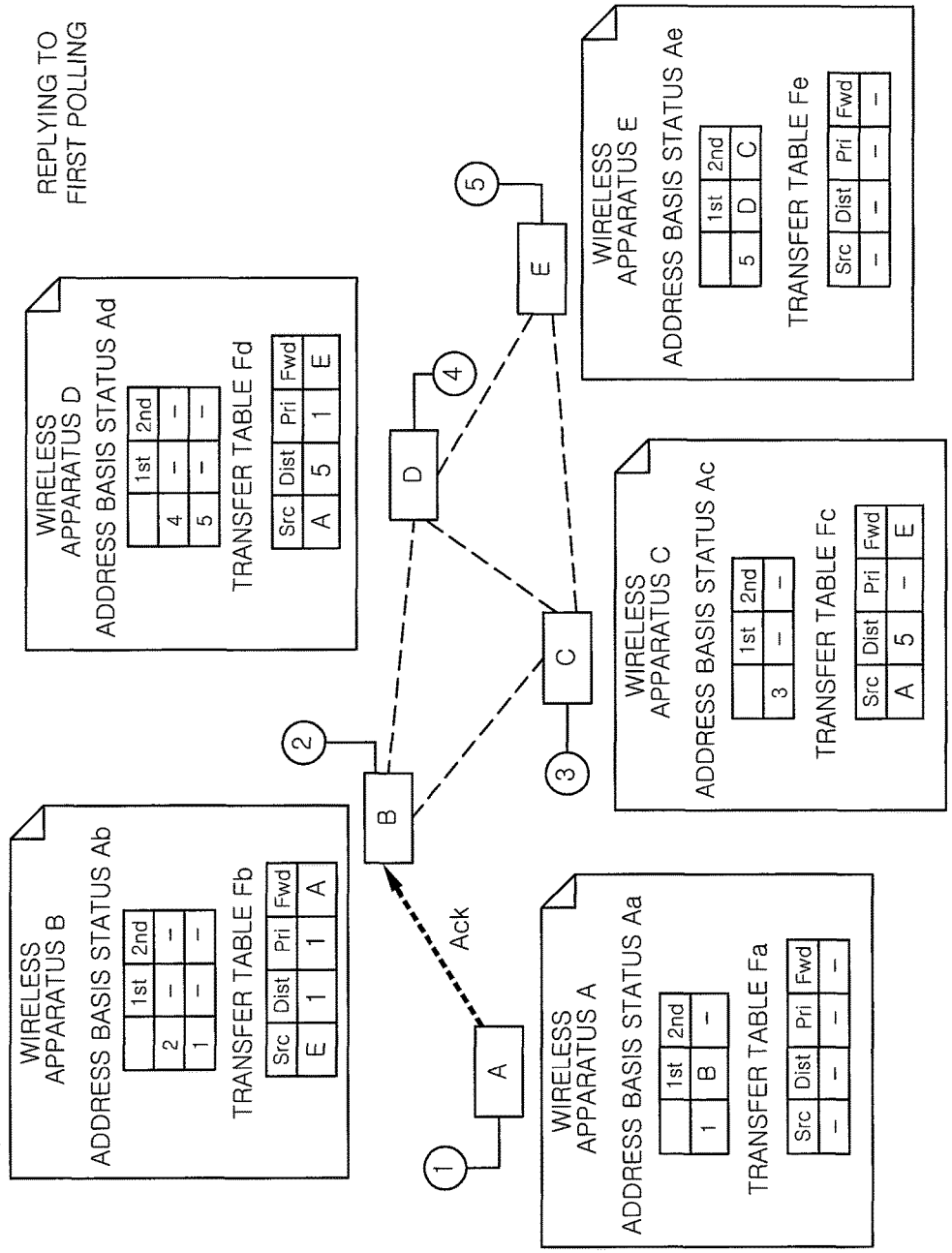

Then, the wireless apparatus A transmits the Ack packet for the received message packet to neighboring wireless apparatuses as shown in FIG. 18. In the transmission source station address area of the header of the Ack packet, the information of the wireless apparatus E is stored. In the transmission destination address area, the information of the device 1 is stored. In the address basis status area, the records for the device 1 in the address basis status Aa of the wireless apparatus A are stored. In other words, the information "1st: B, 2nd: empty" is stored in the address basis status area.

The wireless apparatus B that has received the Ack packet recognizes from the address basis status area of the header that the message packet for the device 1 is to be transferred by the wireless apparatus B. Therefore, the records "Src: E, Dist: 1, Pri: 1, Fwd: A" are created in the transfer table Fb of the wireless apparatus B.

Since Pri is 1, records for the device 1 are newly added to the address basis status Ab of the wireless apparatus B. Since, however, a wireless apparatus from which it receives the message packet for the device 1 is not known, the first area and the second area are empty.

Next, the transmission/reception of the message packet for the second polling will be described with reference to FIGS. 19 to 26. In the following, the case in which the address basis status or the transfer table is not updated will not be described, and the update of the tables will be mainly described.

First, the device 1 transfers user data for acquiring the second polling data to the wireless apparatus A. The wireless apparatus A that has received the user data generates a message packet for the device 5. In the transmission source station address area of the header of the message packet, the information of the wireless apparatus A is stored. In the transmission destination address area, the information of the device 5 is stored. In the transfer source station address area, the information of the wireless apparatus A is stored.

The wireless apparatus A refers to the transfer table Fa and recognizes that the records for the device 5 do not exist. Therefore, the transfer destination station address area is empty. Since the records for the device 5 do not exist in the address basis status Aa of the wireless apparatus A, the address basis status area is also empty.

Figure 19:
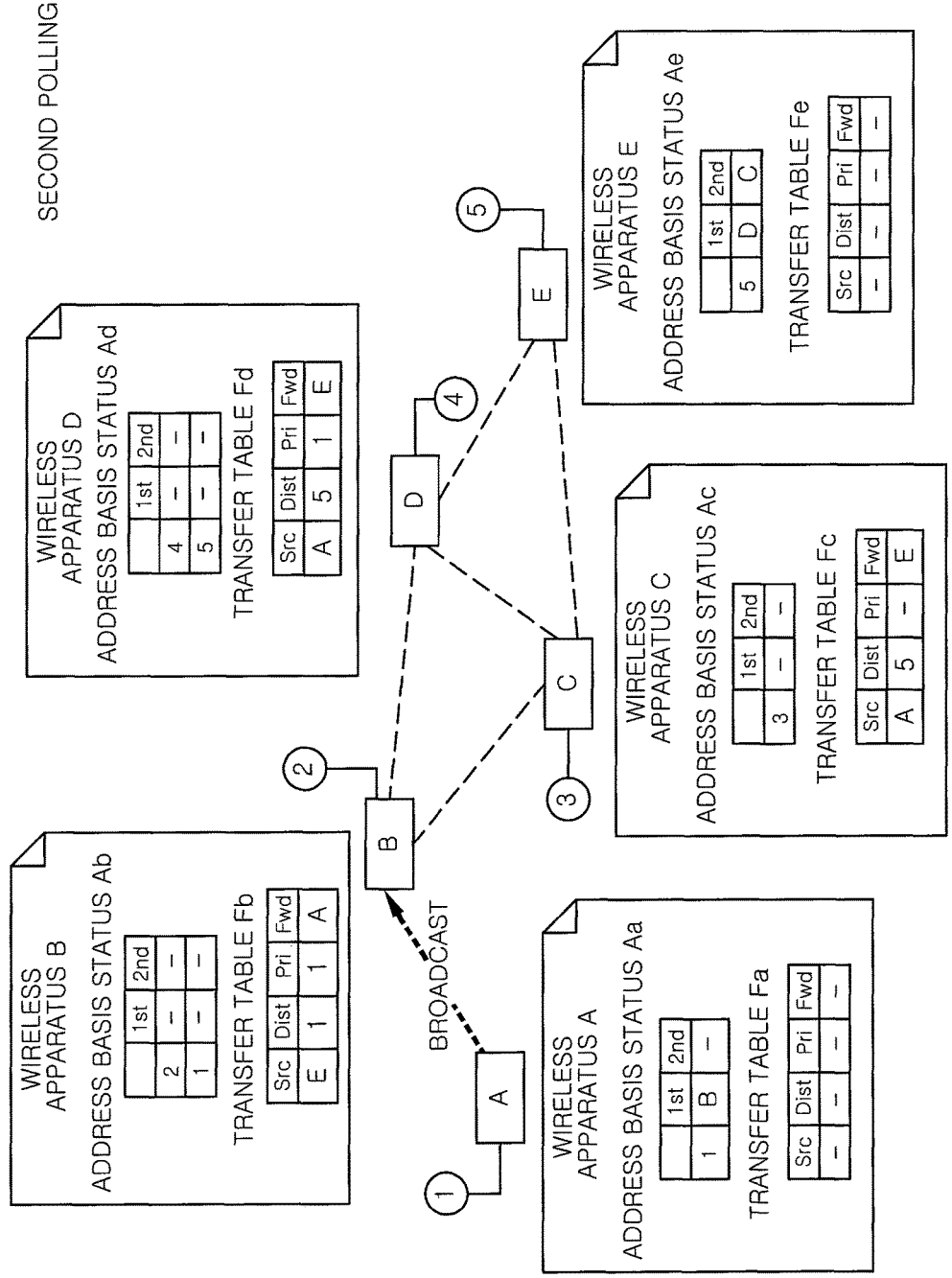
FIGS. 19 to 22 show flows of the message packet in the case of second polling.

The wireless apparatus A that has generated the message packet transmits the message packet to neighboring wireless apparatuses by performing broadcast communication as shown in FIG. 19.

Figure 20:
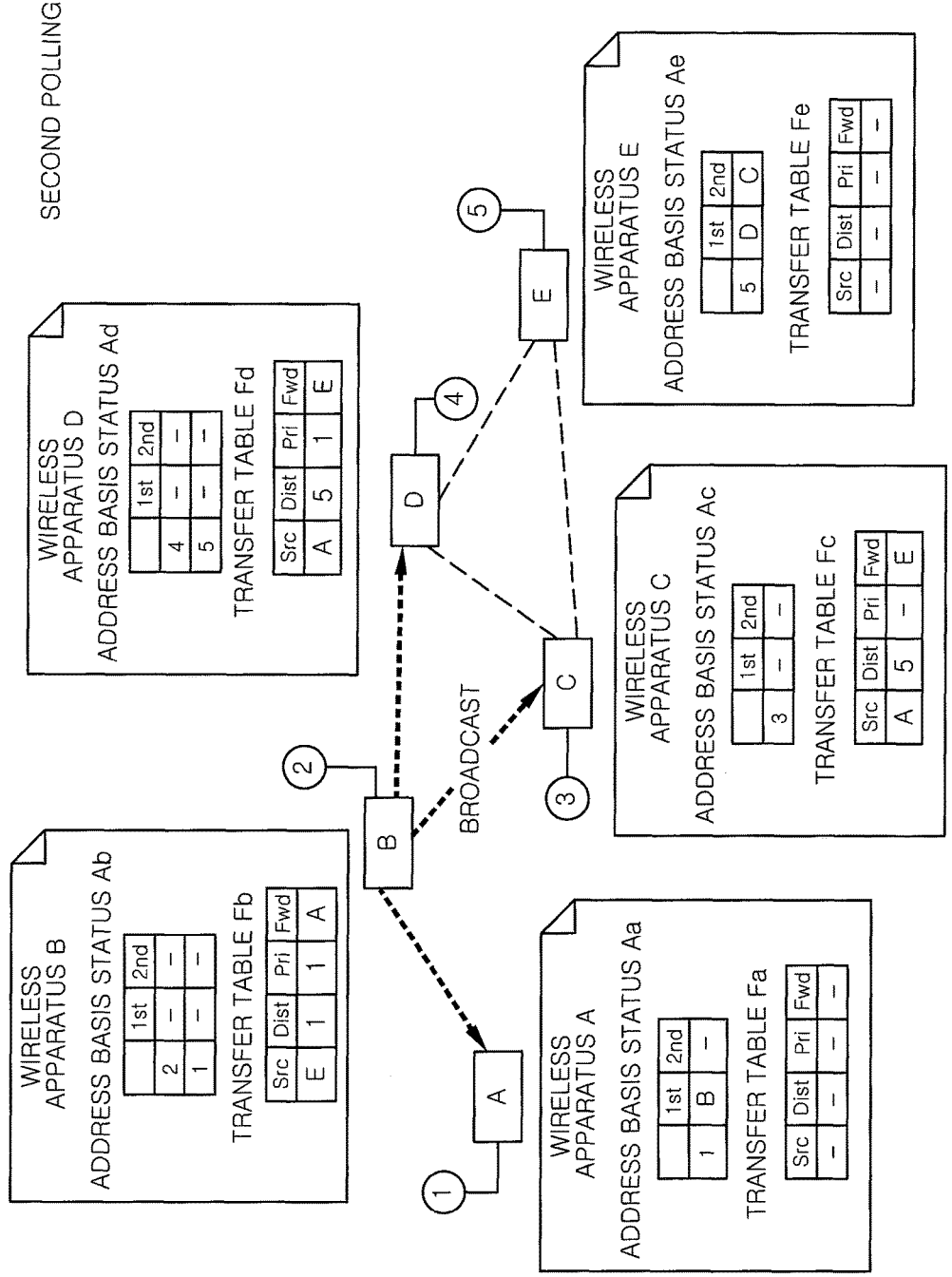

The wireless apparatus B that has received the message packet from the wireless apparatus A refers to the transfer table Fb and checks that the transfer destination is not set. Thus, the wireless apparatus B performs a transfer operation using the broadcast communication as shown in FIG. 20.

The wireless apparatus C that has received the message packet from the wireless apparatus B refers to the transfer table Fc and checks that the transfer destination is not set. Thus, the elapse of the random wait time of the wireless apparatus C is started in order to prepare for the transfer operation using broadcast communication.

The wireless apparatus D that has received the message packet from the wireless apparatus B calculates the link score of the wireless apparatus B and updates the address basis status Ad. The transmission destination of the message packet received at this time is the device 5, so that the records for the device 5 are updated. Since the first area and the second area of the records for the device 5 are empty, the information of the wireless apparatus B is stored in the first area.

Figure 21:
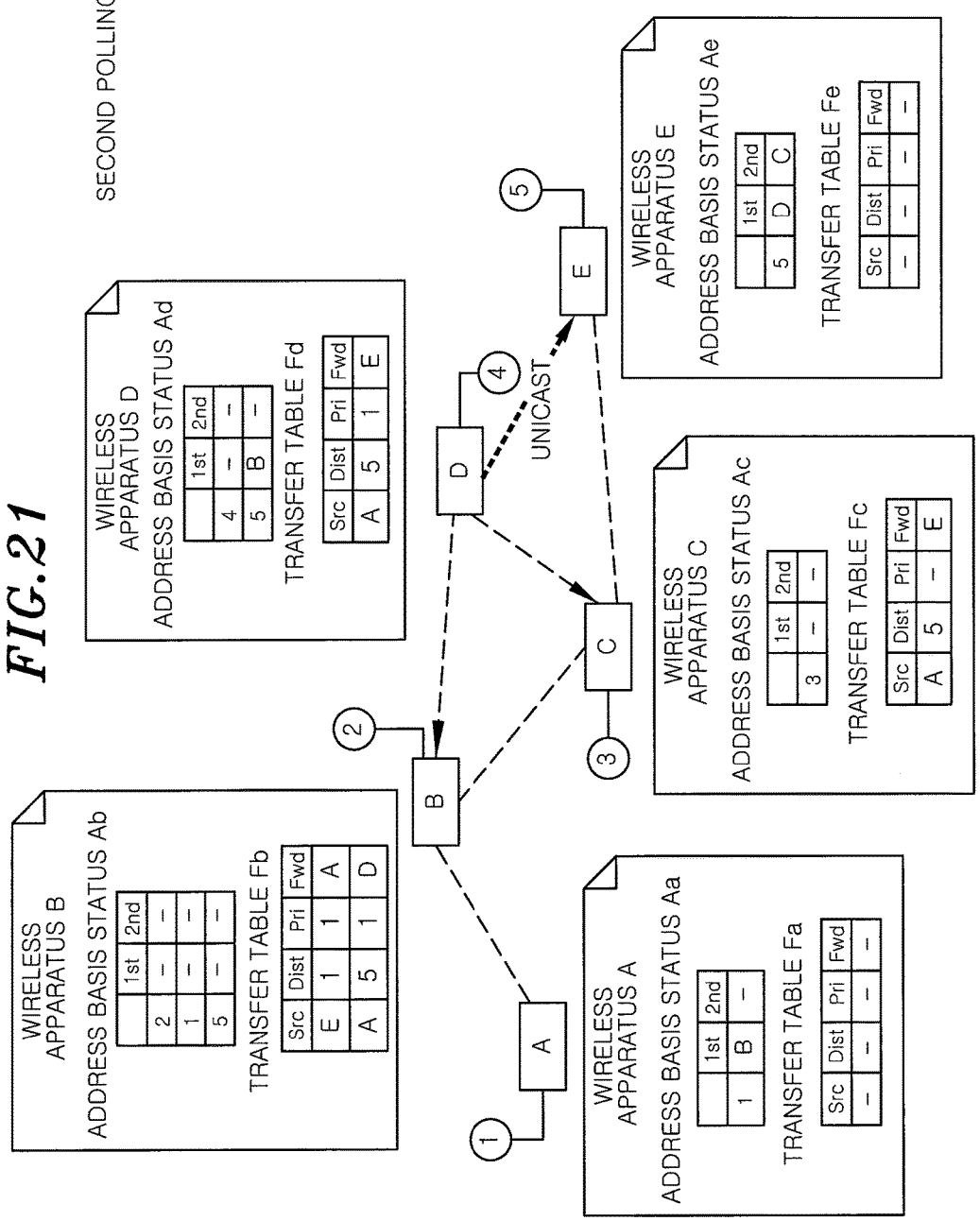

Next, the wireless apparatus D refers to the transfer table Fd and checks that the records "Src: A, Dist: 5" are stored. Further, the wireless apparatus D checks that Pri is 1 and then performs a transfer operation immediately (without the random wait time) by using unicast communication in which the transfer destination is specified as shown in FIG. 21.

Specifically, in the header of the message packet, the information of the wireless apparatus A is stored in the transmission source station address area. In the transmission source address area, the information of the device 5 is stored. In the transfer source station address area, the information of the wireless apparatus D is stored. In the transfer destination station address area, the information of the wireless apparatus E is stored. Since the information of the specific wireless apparatus is stored in the transfer destination station address area, other information processing units perform unicast communication for the specific wireless apparatus.

In the address basis status area of the header of the message packet, the records for the device 5 in the address basis status Ad of the wireless apparatus D are stored.

In the transfer table Fd of the wireless apparatus D, if Pri in the records for the device 5 is 2, a fixed wait time (e.g., a period of time required until the transfer station corresponding to "Pri=1" performs a transfer operation and the Ack packet is received) is prepared. When the Ack packet (or proxy Ack packet) is not received during the wait time, the transfer operation corresponding to "Pri=2" is performed.

The wireless apparatus B that has received the message packet from the wireless apparatus D checks the address basis status area and recognizes that the wireless apparatus B itself exists on the communication path having the first priority in the case of sending the message packet from the wireless apparatus A to the device 5. The corresponding message packet is considered as the proxy Ack packet and the records "Src: A, Dist: 5, Pri: 1, Fwd: D" are newly added to the transfer table Fb. Since the record "Pri: 1" exists, the wireless apparatus B starts to manage the information for the device 5 in the address basis status Ab.

The wireless apparatus C that has received the message packet from the wireless apparatus D checks that the message packet is the same as that previously received from the wireless apparatus B and then destroys the newly received message packet.

The wireless apparatus E that has received the message packet from the wireless apparatus D extracts the information of the user data area of the message packet and transmits the extracted information to the device 5.

The wireless apparatus E calculates the link score of the wireless apparatus D and updates the address basis status Ae. Specifically, whether or not the calculated score is lower than the link score (i.e., 2nd) of the wireless apparatus C is checked and, then, the updating process is performed.

Figure 22:
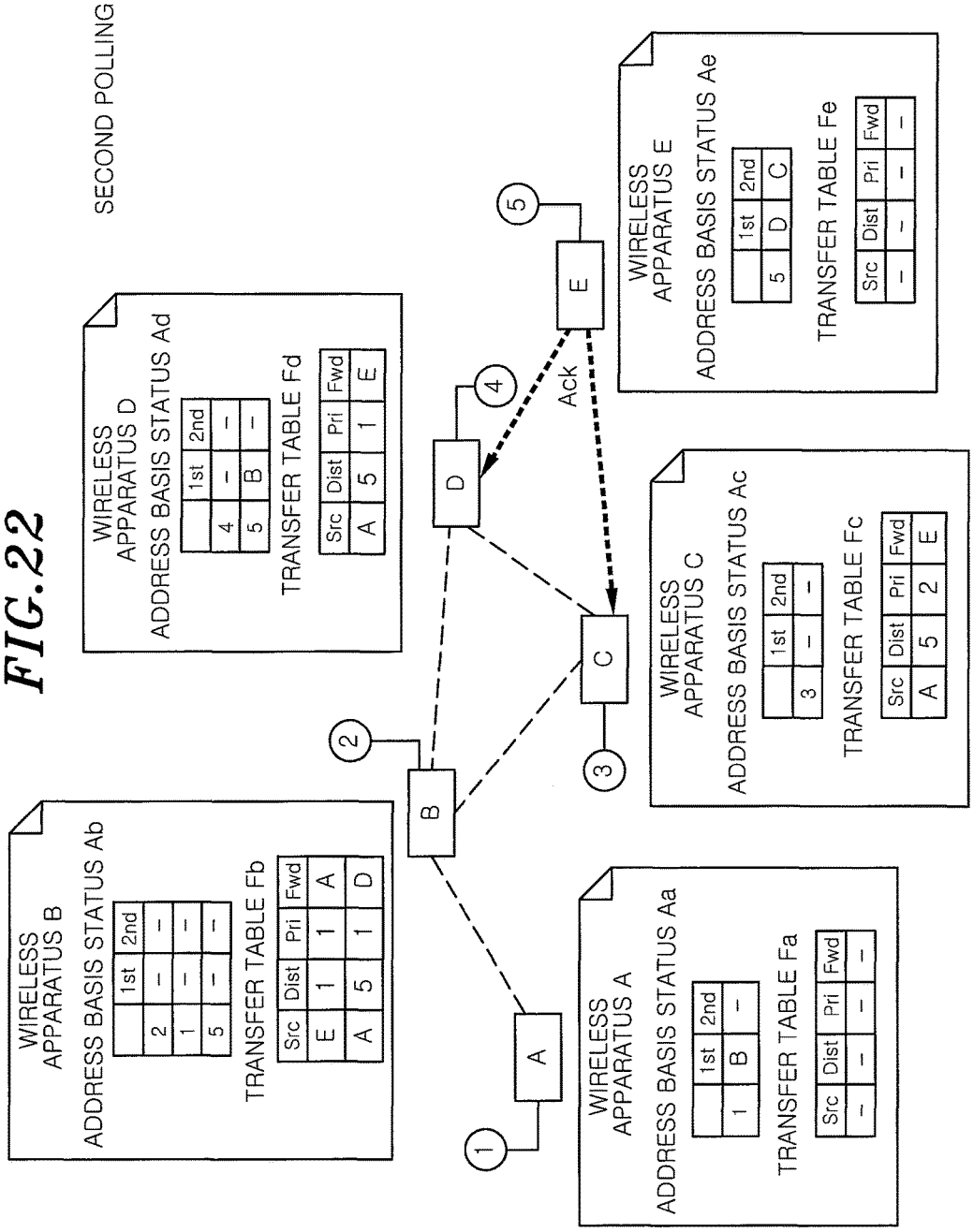

Then, the wireless apparatus E transmits the Ack packet for the received message packet to neighboring wireless apparatuses as shown in FIG. 22. In the address basis status area of the Ack packet, the records for the device 5 in the address basis status Ae of the wireless apparatus E, i.e., the records "1st: D, 2nd: C", are stored.

The wireless apparatus D that has received the Ack packet from the wireless apparatus E reads out the header. At this time, it is recognized from the address basis status area of the header that the wireless apparatus E manages to receive the message packet for the device 5 from the wireless apparatus D continuously.

The wireless apparatus C that has received the Ack packet from the wireless apparatus E recognizes that the received message packet has reached the wireless apparatus E and destroys the held message packet during the random wait time.

The wireless apparatus C that has read out the header acquires the priority of the address basis status Ae of the wireless apparatus E from the header of the Ack packet and updates the transfer table Fc. Specifically, in the records "Src: A, Dist: 5", Pri is updated from undetermined to 2. Similarly to FIG. 12, since Pri is not 1, the records for the device 5 are not created in the address basis status Ac.

Hereinafter, a process in which the device 5 replies to the second polling will be described.

The wireless apparatus E that has received the polling data from the device 5 generates a message packet for the device 1. In the transmission source station address area of the header of the message packet, the information of the wireless apparatus E is stored. In the transmission destination address area, the information of the device 1 is stored. In the transfer source station address area, the information of the wireless apparatus E is stored.

Figure 23:
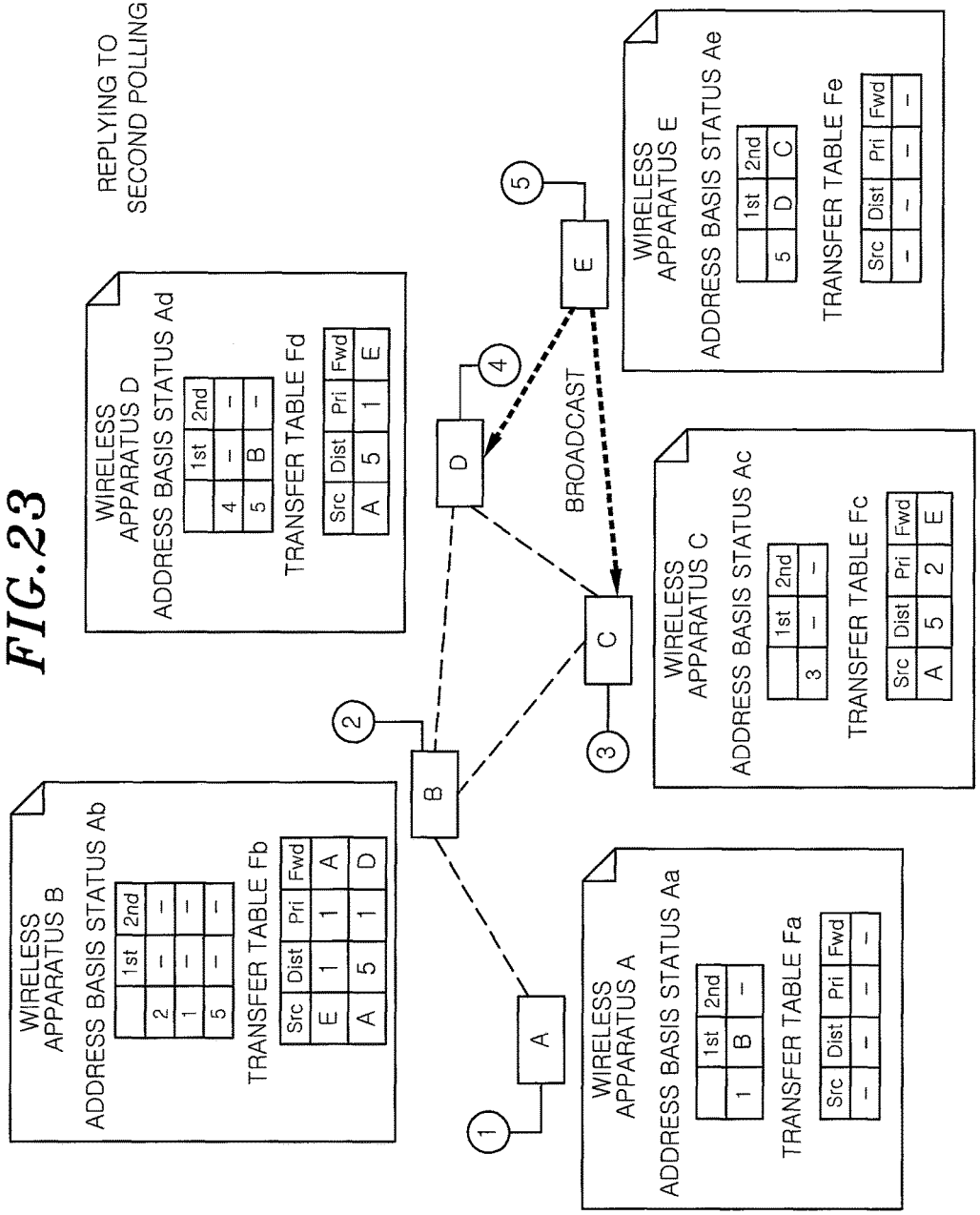
FIGS. 23 to 26 show flows of the message packet in the case of replying to the second polling.

The wireless apparatus E refers to the transfer table Fe and checks that the records for the device 1 are not stored. Therefore, the transfer destination station address area becomes empty. Further, since the records for the device 1 do not exist in the address basis status Ae of the wireless apparatus E, the address basis status area becomes empty. The wireless apparatus E that has generated the message packet transmits the message packet to neighboring wireless apparatuses by performing broadcast communication as shown in FIG. 23.

The wireless apparatuses C and D that have received the message packet from the wireless apparatus E refer to the transfer tables Fc and Fd and check that the transfer destination is not set. Thus, the transfer operation is performed after respective random wait times elapse. Here, it is assumed that the random wait time of the wireless apparatus D elapses first.

Figure 24:
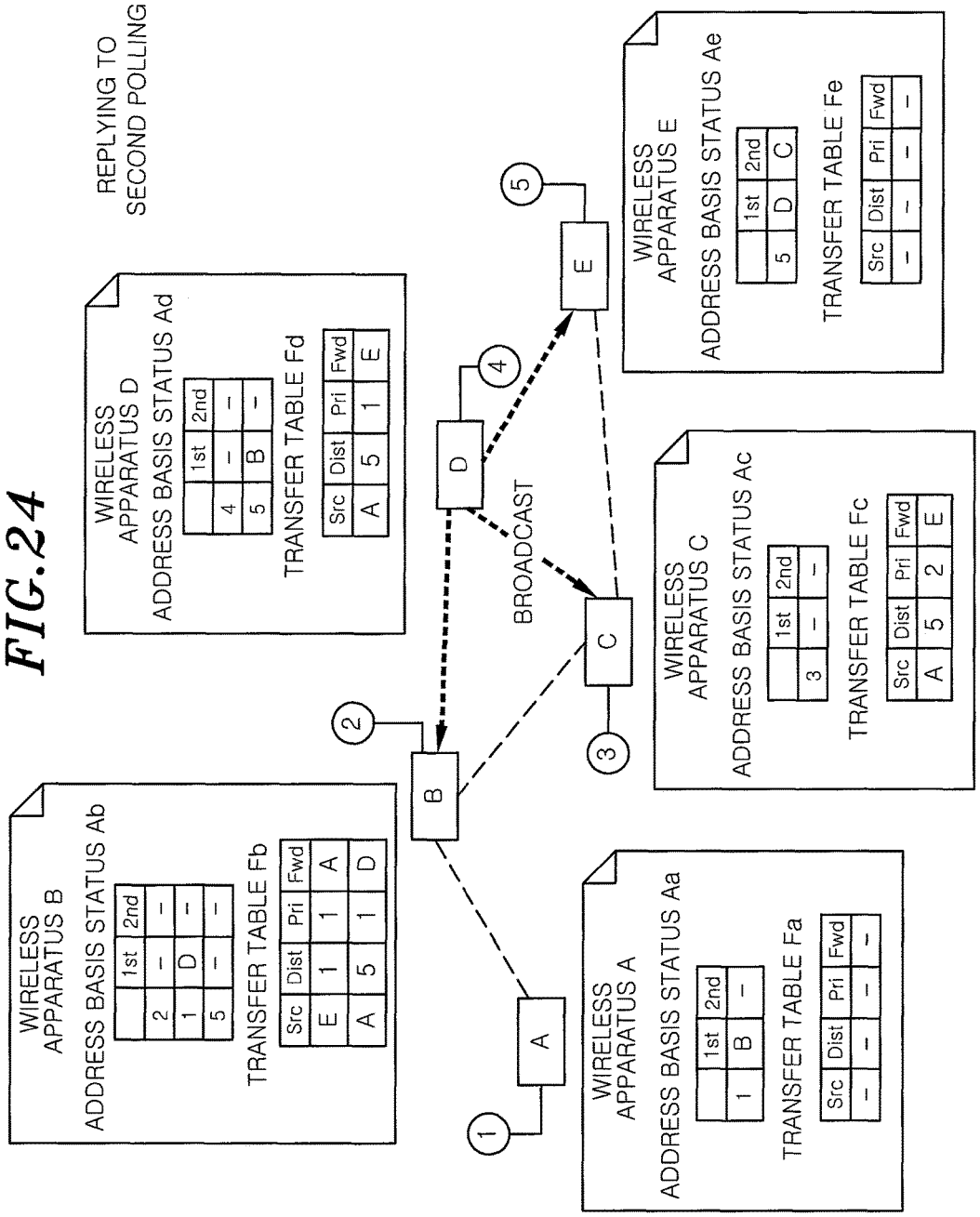

The wireless apparatus D of which wait time has elapsed transfers the message packet to neighboring wireless apparatuses by performing broadcast communication as shown in FIG. 24. In the transfer source station address area of the transmitted message packet, the information of the wireless apparatus D is stored. The transfer destination station address area and the address basis status area are empty. The message packet is received by the wireless apparatuses B and C and also received by the wireless apparatus E.

The wireless apparatus C that has received the message packet from the wireless apparatus D checks that the received message packet is the same as that previously received from the wireless apparatus E and then destroys the received message packet.

The wireless apparatus B that has received the message packet from the wireless apparatus D calculates the link score of the wireless apparatus D and updates the address basis status Ab. Specifically, the message packet is for the device 1, so that the information of the wireless apparatus D is stored in the first area of the records for the device 1.

Figure 25:
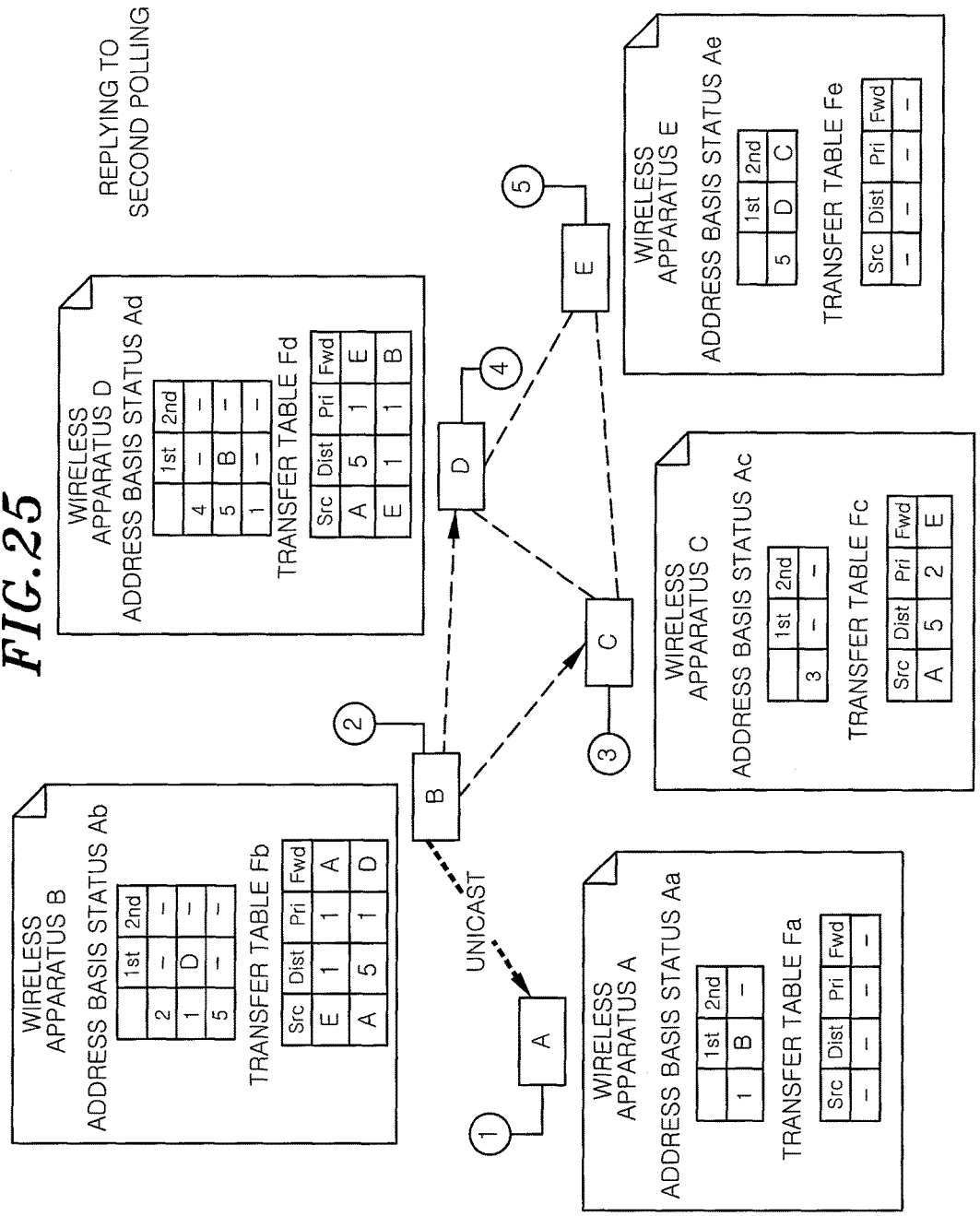

Next, the wireless apparatus B checks the transfer table Fb and transfers the message packet by performing unicast communication as shown in FIG. 25. In the transmission source station address area of the header of the message packet, the information of the wireless apparatus E is stored. In the transmission destination address area, the information of the device 1 is stored. In the transfer source station address area, the information of the wireless apparatus B is stored. In the transfer destination station address area, the information of the wireless apparatus A is stored. In the address basis status area, the records for the device 1 (1st: D, 2nd: empty) in the address basis status Ab of the wireless apparatus B are stored.

The wireless apparatus D that has received the message packet transferred from the wireless apparatus B to the wireless apparatus A by unicast communication recognizes that the wireless apparatus D itself has the first priority for the device 1. The wireless apparatus D receives the message packet as the proxy Ack packet and start to manage the information for the device 1.

The wireless apparatus A that has received the message packet transferred by unicast communication calculates the link score of the wireless apparatus B and updates the address basis status Aa. Further, the wireless apparatus A acquires the user data from the user data area of the message packet and transmits the user data to the device 1.

Figure 26:
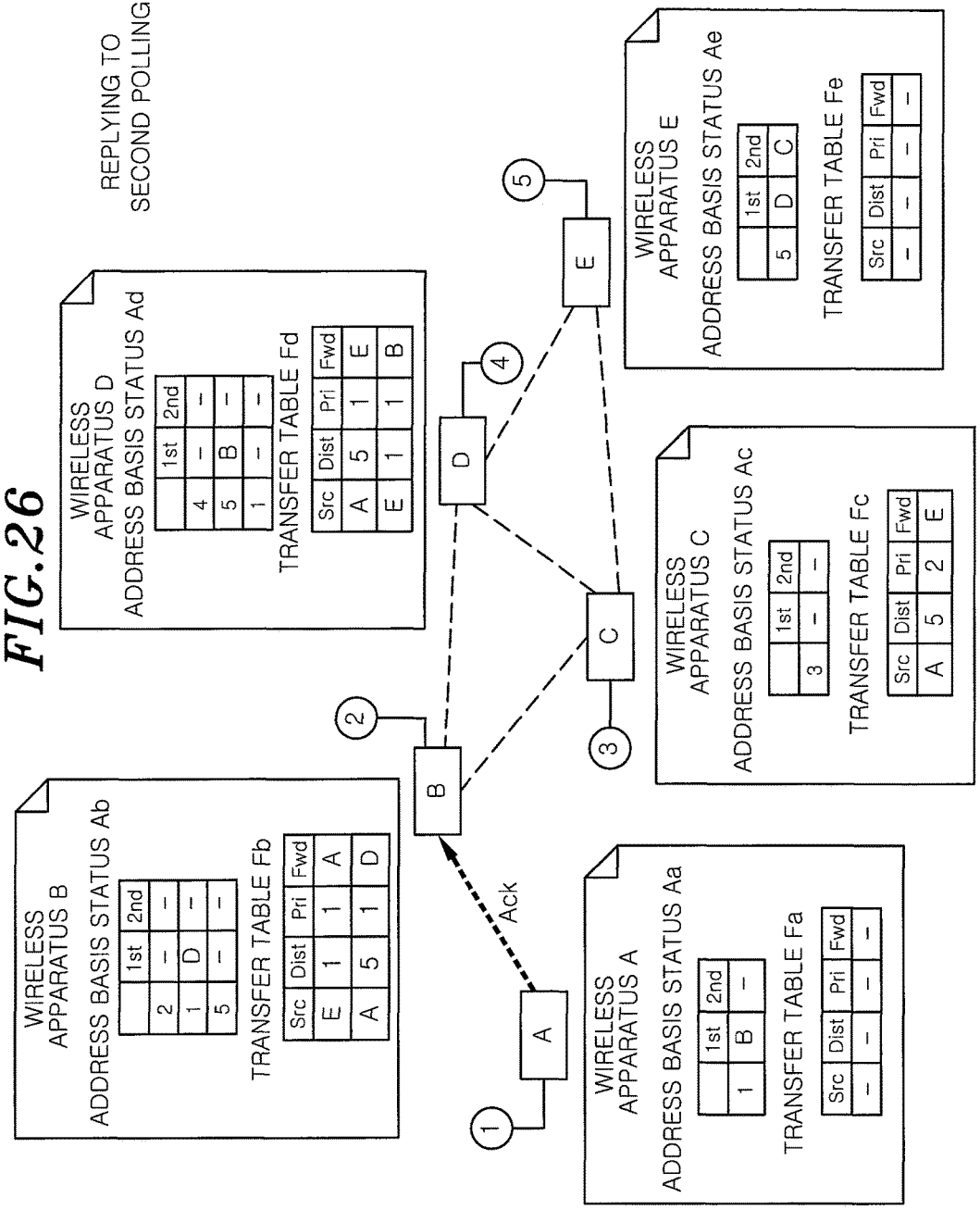

The wireless apparatus A transmits the Ack packet for the received message packet to neighboring wireless apparatuses as shown in FIG. 26. In the address basis status area of the Ack packet, the records for the device 1 (1st: B, 2nd: empty) in the address basis status Aa of the wireless apparatus A are stored. The Ack packet from the wireless apparatus A is received by the wireless apparatus B.

Finally, the transmission/reception of the message packet for the third polling will be described with reference to FIGS. 27 to 34.

First, the device 1 transfers user data for acquiring the third polling data from the device 5 to the wireless apparatus A. The wireless apparatus A that has received the user data generates a message packet for the device 5. In the header of the message packet, the information same as that in the second polling data is stored.

Figure 27:
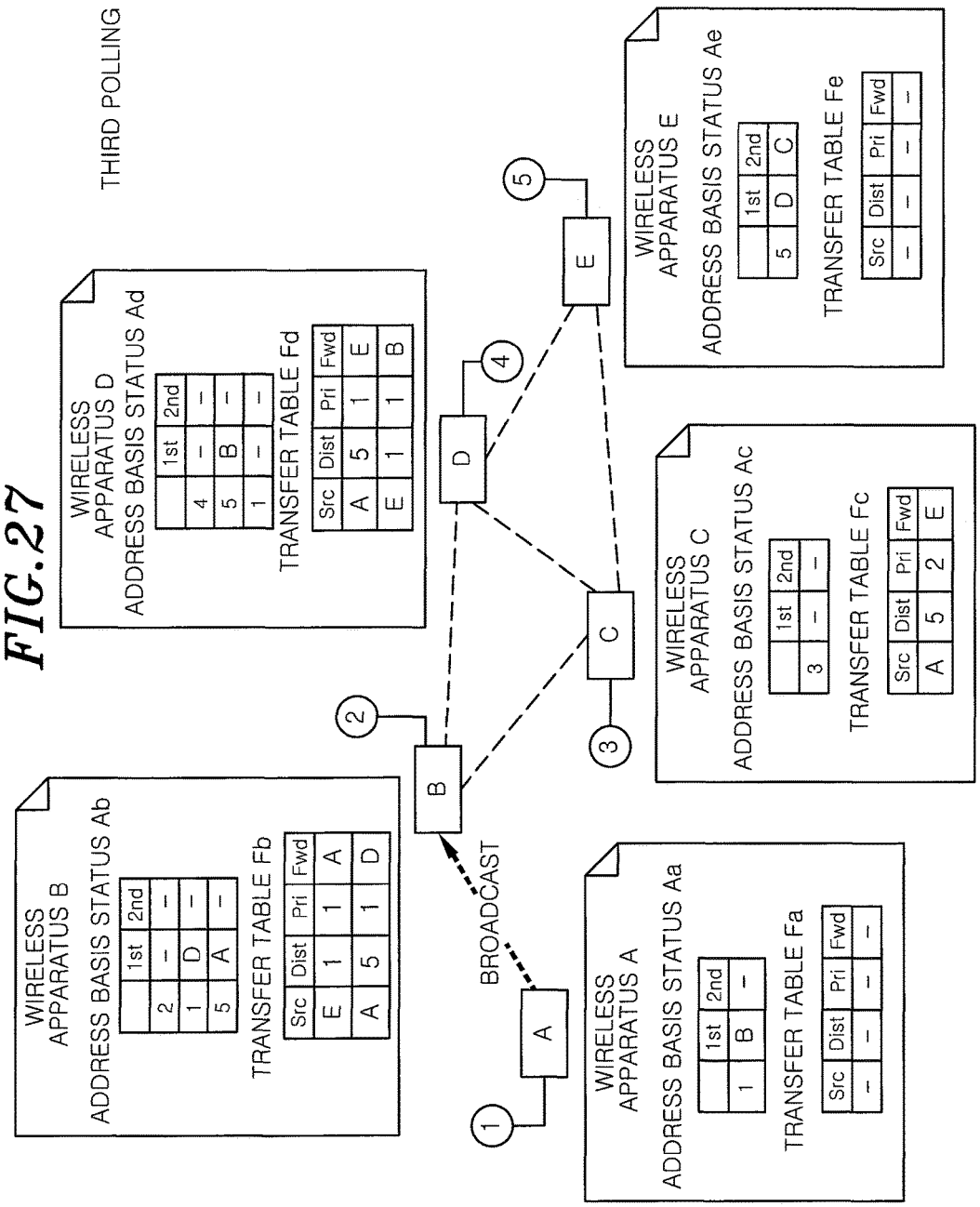
FIGS. 27 to 30 show flows of the message packet in the case of third polling.

The wireless apparatus A that has generated the message packet transmits the message packet to neighboring wireless apparatuses by performing broadcast communication as shown in FIG. 27.

The wireless apparatus B that has received the message packet from the wireless apparatus A calculates the link score of the wireless apparatus A and updates the address basis status Ab. Specifically, the information of the wireless apparatus A is stored in the first area of the records for the device 5.

Figure 28:
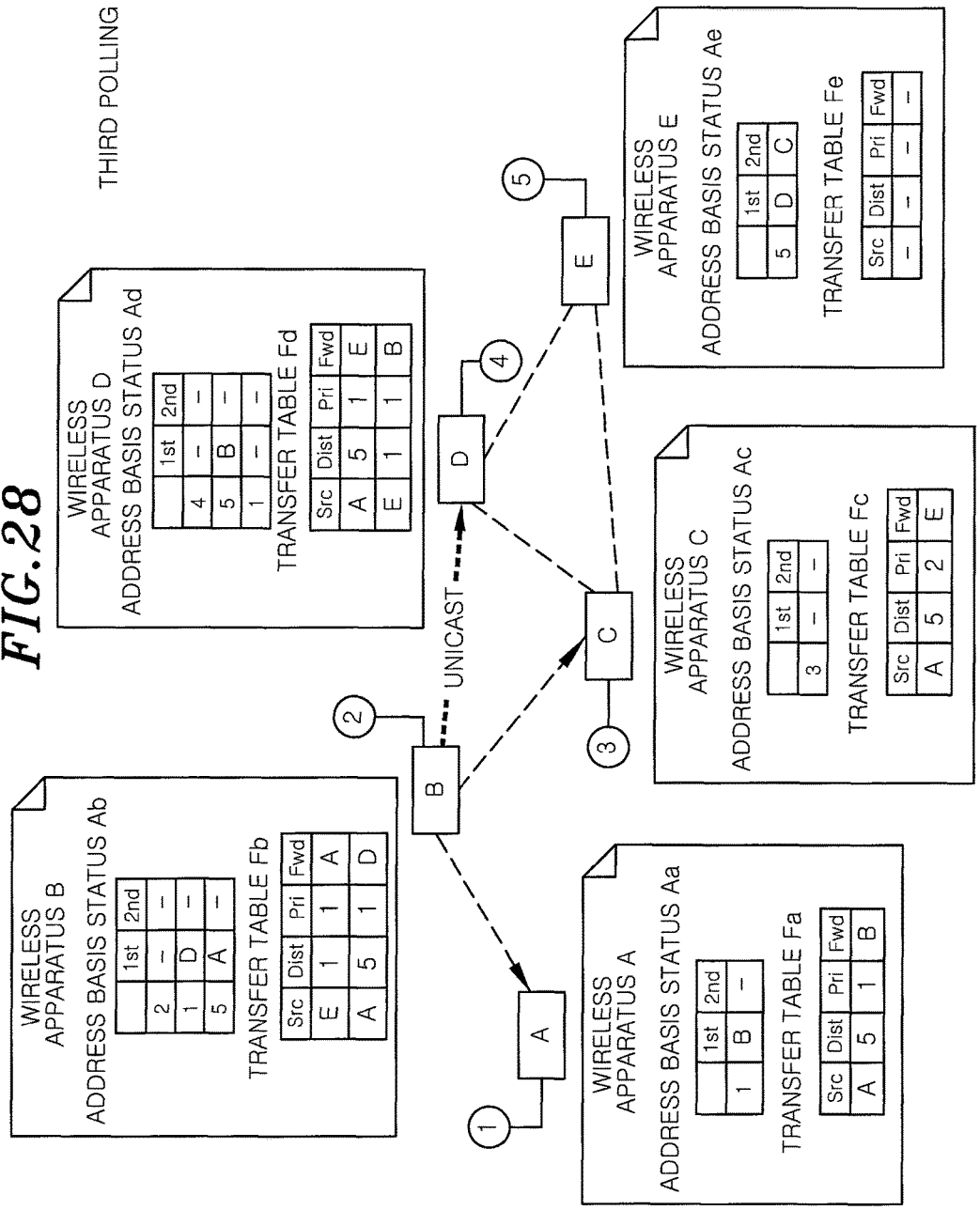
Figure 29:
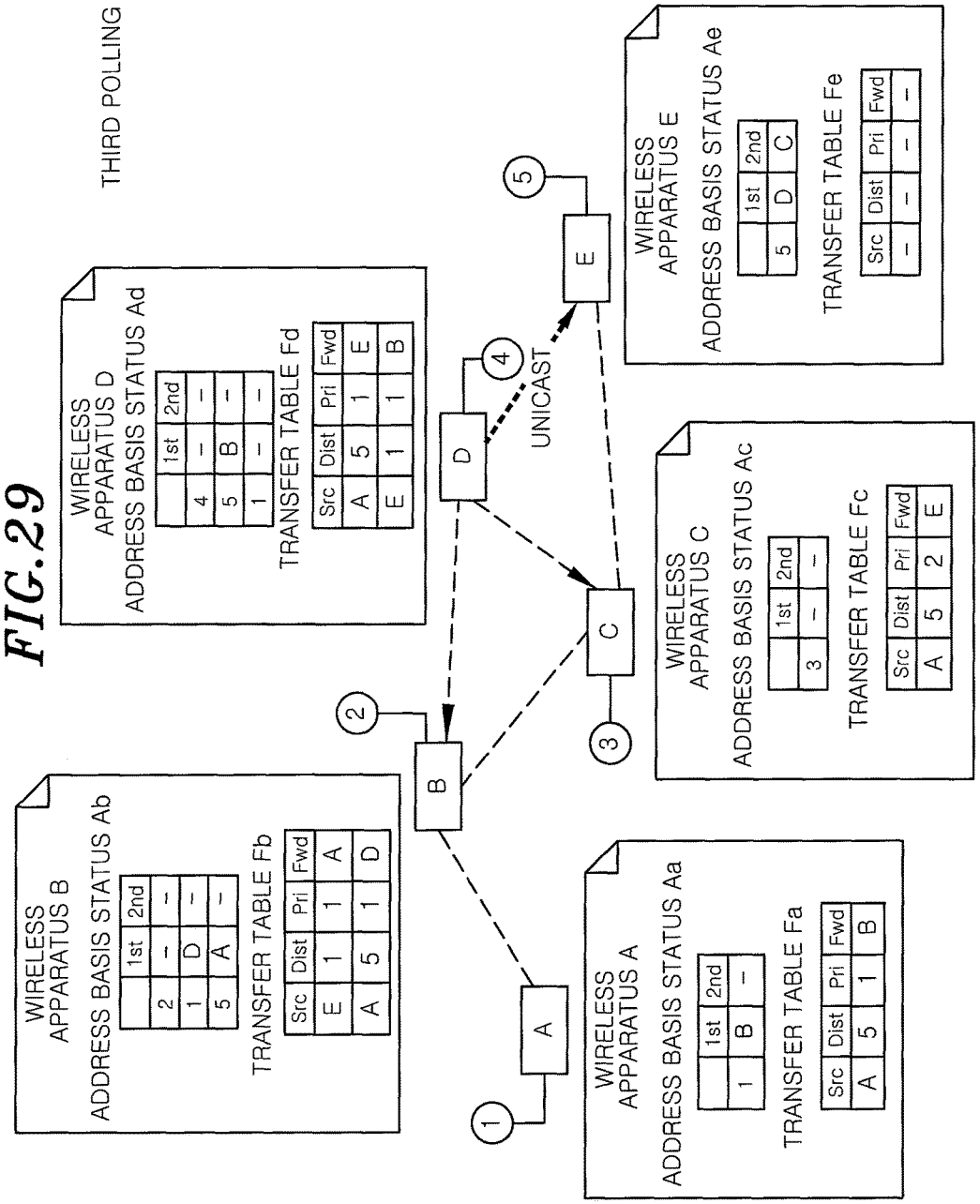

Next, the wireless apparatus B refers to the transfer table Fb and checks that the records "Src: A, Dist: 5, Pri: 1, Fwd: D" are stored. Then, the wireless apparatus B immediately transfers the message packet to the wireless apparatus D by using unicast communication as shown in FIG. 28.

The wireless apparatus A that has received the message packet from the wireless apparatus B recognizes that the message packet for the device 5 is to be transferred to the wireless apparatus B and considers the corresponding message packet as the proxy Ack packet. Therefore, the records "Src: A, Dist: 5, Pri: 1, Fwd: B" are created in the transfer table Fa of the wireless apparatus A.

The wireless apparatus C that has received the message packet from the wireless apparatus B starts to elapse the random wait time while keeping the corresponding message packet as in the case of the second polling.

The wireless apparatus D that has received the message packet from the wireless apparatus B calculates the link score for the wireless apparatus B and updates the address basis status Ad.

Next, the wireless apparatus D refers to the transfer table Fd and immediately transfers the message packet to the wireless apparatus E by using unicast communication based on the records "Src: A, Dist: 5" (see FIG. 29).

The message packet from the wireless apparatus D is received as the proxy Ack packet by the wireless apparatus B. The wireless apparatus C that has received the message packet from the wireless apparatus D checks that the corresponding message packet is the same as the kept message packet and then destroys the newly received message packet. At this moment, the wait time of the wireless apparatus C is elapsing.

The wireless apparatus E that has received the message packet from the wireless apparatus D extracts the information of the user data area of the message packet and transmits the extracted information to the device 5. The wireless apparatus E calculates the link score of the wireless apparatus D and updates the address basis status Ae.

Figure 30:
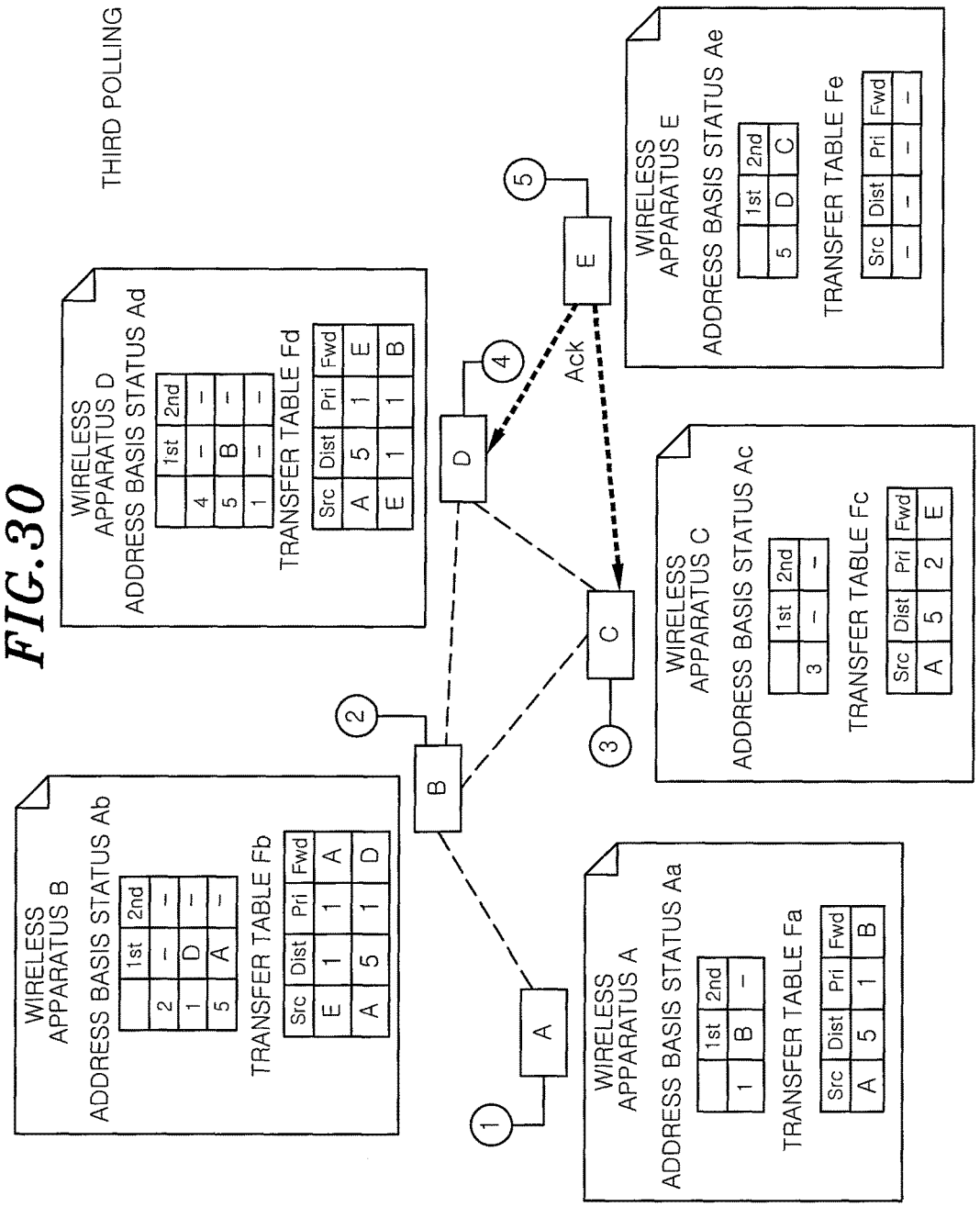

Next, the wireless apparatus E transmits the Ack packet for the received message packet to neighboring wireless apparatuses as shown in FIG. 30. The Ack packet from the wireless apparatus E is received by the wireless apparatuses C and D. When the wireless apparatus C receives the Ack packet, the wait time is stopped and the previously received message packet (transmitted from the wireless apparatus B) is destroyed.

Hereinafter, a process in which the device 5 replies to the third polling will be described.

Figure 31:
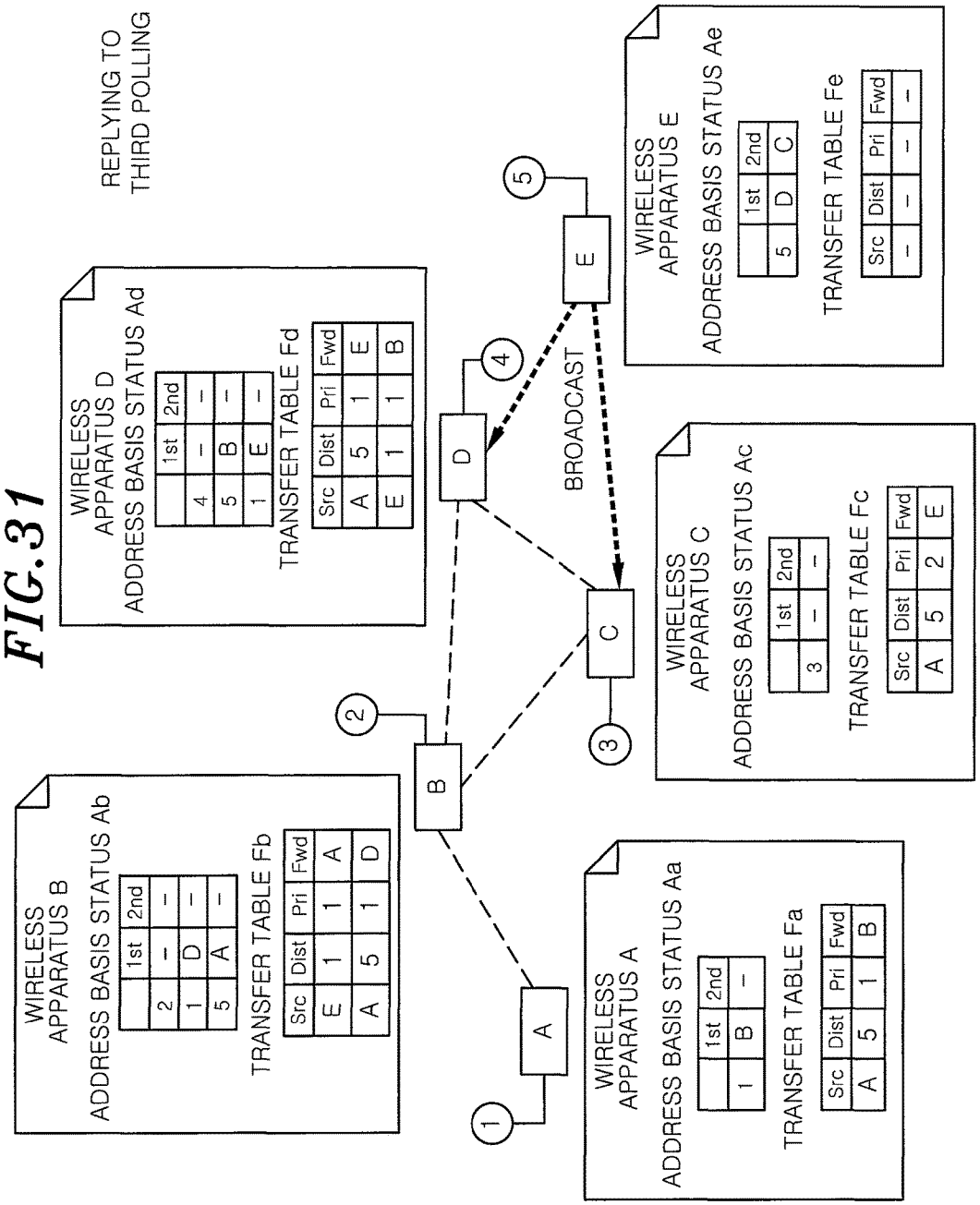
FIGS. 31 to 34 show flows of the message packet in the case of replying to the third polling.

The wireless apparatus E that has received the polling data from the device 5 generates a message packet for the device 1 and transmits the message packet to neighboring wireless apparatuses by using broadcast communication as shown in FIG. 31.

The wireless apparatus D that has received the message packet from the wireless apparatus E calculates the link score of the wireless apparatus E and updates the address basis status Ad. Specifically, the information of the wireless apparatus E is stored in the first area of the records for the device 1.

Figure 32:
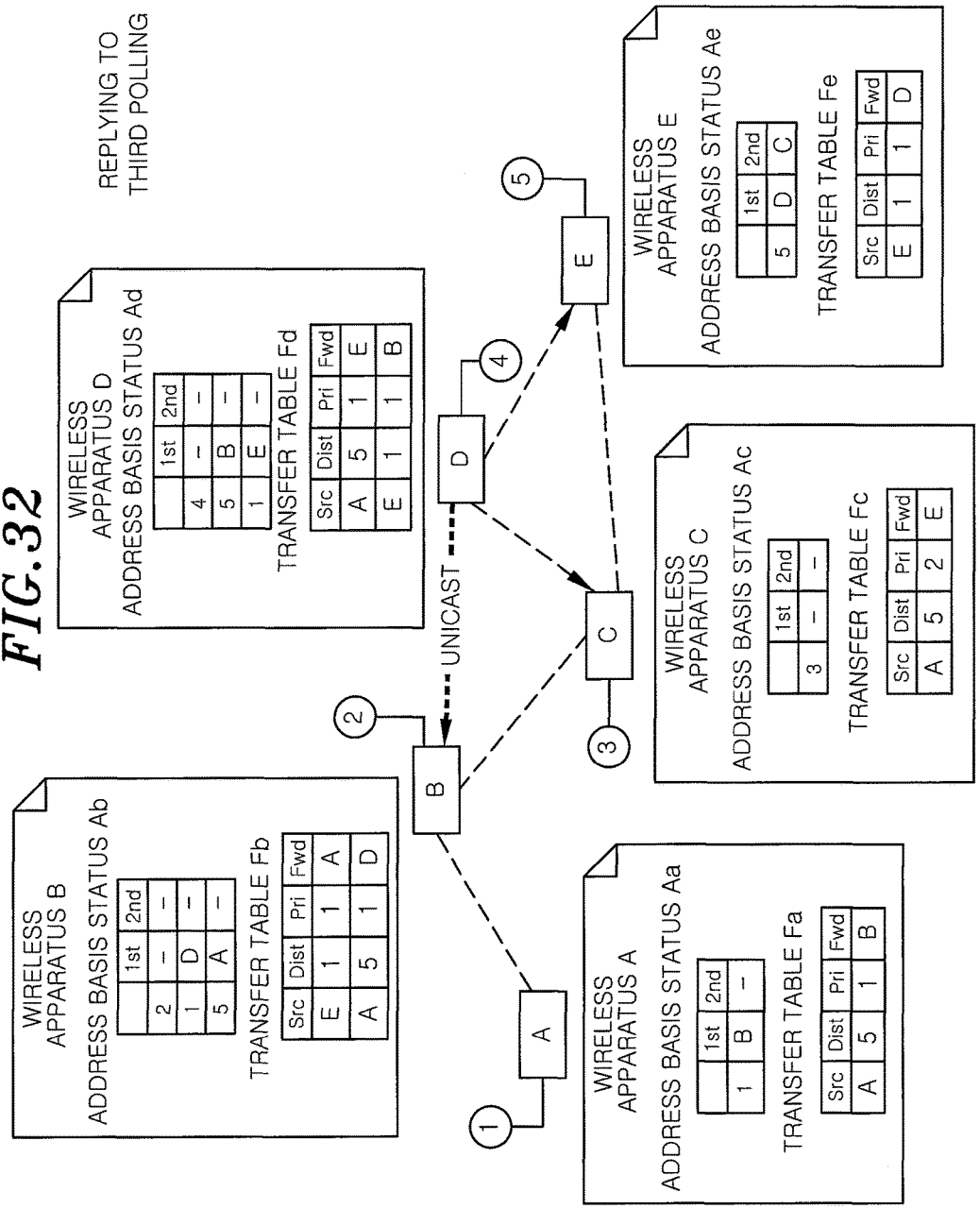
Figure 33:
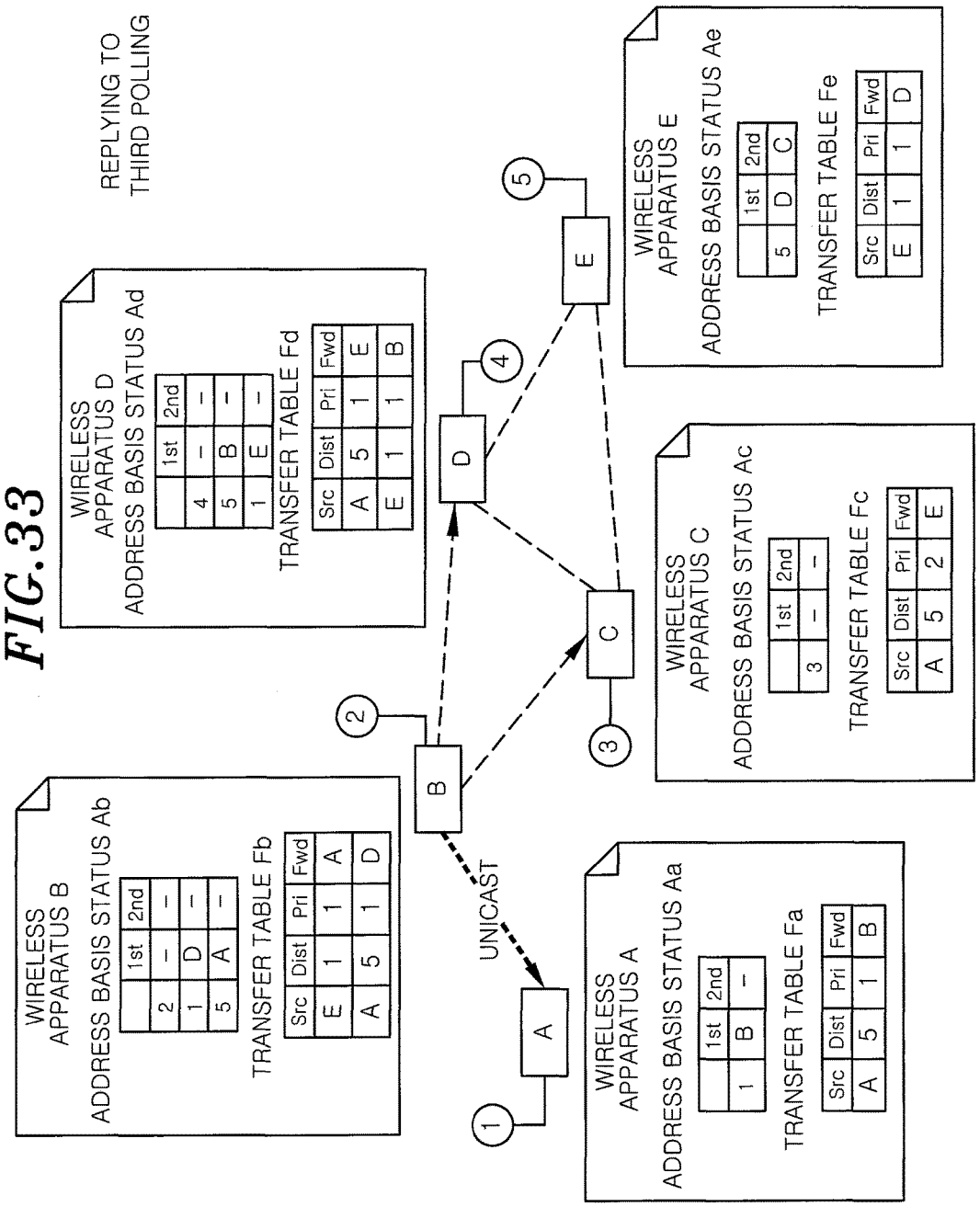

Next, the wireless apparatus D refers to the transfer table Fd and checks that the records "Src: E, Dist: 1, Pri: 1, Fwd: B" are stored. Then, the wireless apparatus D immediately transfers the message packet to the wireless apparatus B by using unicast communication as shown in FIG. 32. The message packet is received as the proxy Ack packet by the wireless apparatus E and also received by the wireless apparatuses B and C.

The wireless apparatus E that has received the proxy Ack packet recognizes that the message packet for the device 1 is to be transferred to the wireless apparatus D. Therefore, the records "Src: E, Dist: 1, Pri: 1, Fwd: D" are created in the transfer table Fe of the wireless apparatus E.

The wireless apparatus B that has received the message packet from the wireless apparatus D calculates the link score of the wireless apparatus D and updates the address basis status Ab. Next, the wireless apparatus B refers to the transfer table Fb and immediately transfers the message packet to the wireless apparatus A by using unicast communication based on the records "Src=E, Dist=1" (see FIG. 33).

The message packet from the wireless apparatus B is received as the proxy Ack packet by the wireless apparatus D. The wireless apparatus C that has received the message packet from the wireless apparatus B checks that the corresponding message packet is the same as the previously received one and destroys the newly received message packet.

The wireless apparatus A that has received the message packet from the wireless apparatus B extracts the information of the user data area of the message packet and transmits the extracted information to the device 1. The wireless apparatus A calculates the link score of the wireless apparatus B and updates the address basis status Aa.

Figure 34:
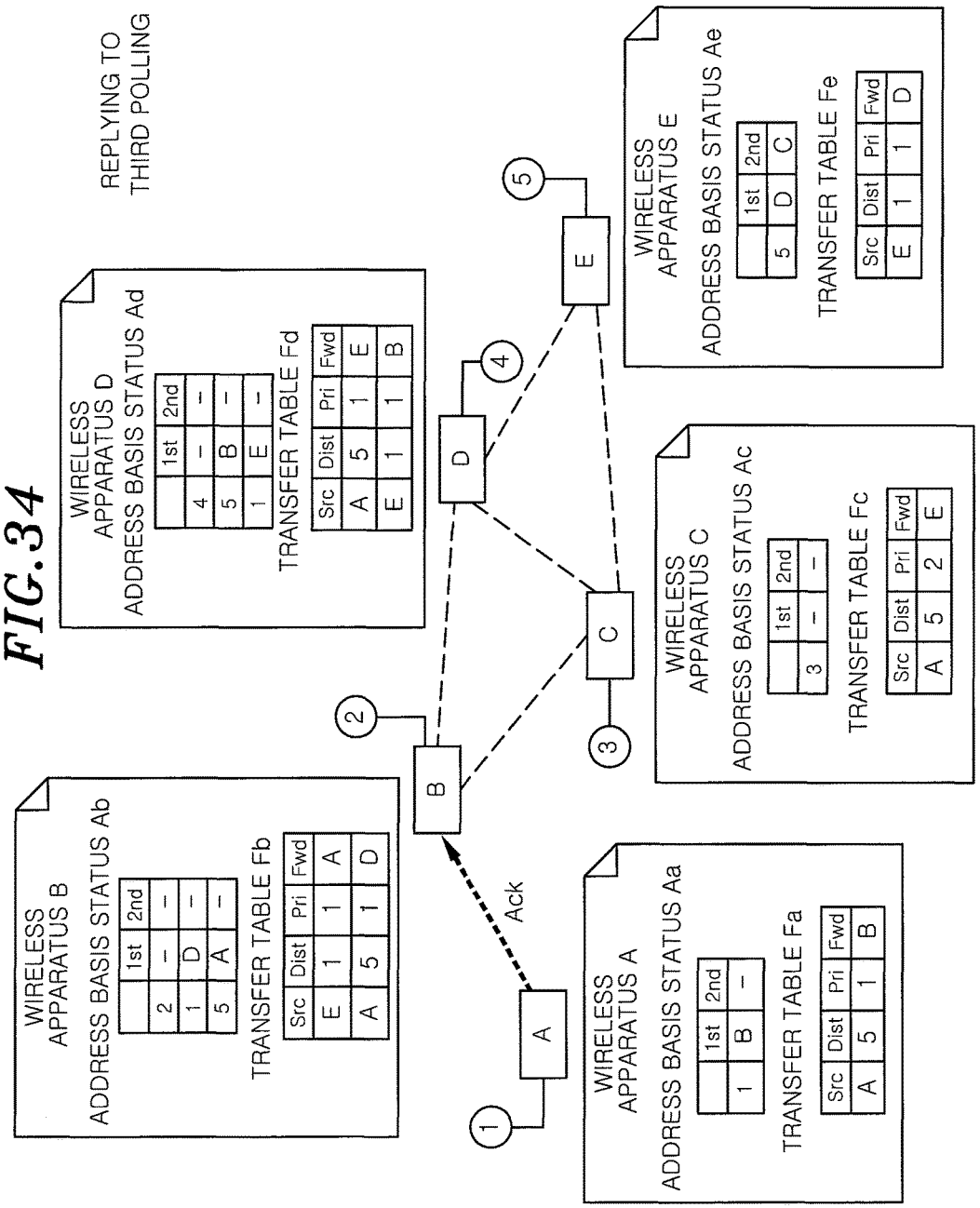

Finally, the wireless apparatus A transmits the Ack packet for the received message packet to neighboring wireless apparatuses as shown in FIG. 34. The Ack packet from the wireless apparatus A is received by the wireless apparatus B.

By the processes of the wireless apparatuses A to E described in FIGS. 9 to 34, the message packet is transmitted from the wireless apparatus A to the device 5 by unicast communication. In other words, there is employed a communication path in which the message packet is transmitted from the wireless apparatus A to the wireless apparatus E via the wireless apparatuses B and D.

The unicast communication is also used when the message packet is transmitted from the wireless apparatus E to the device 1. In other words, there is employed a communication path in which the message packet is transmitted from the wireless apparatus E to the wireless apparatus A via the wireless apparatuses D and B.

5. Transfer Timing

The timing of the transfer operation using the wireless apparatus having the first priority and the timing of the transfer operation using the wireless having the second priority will be described with reference to FIGS. 35A to 36B.

Figure 35A:
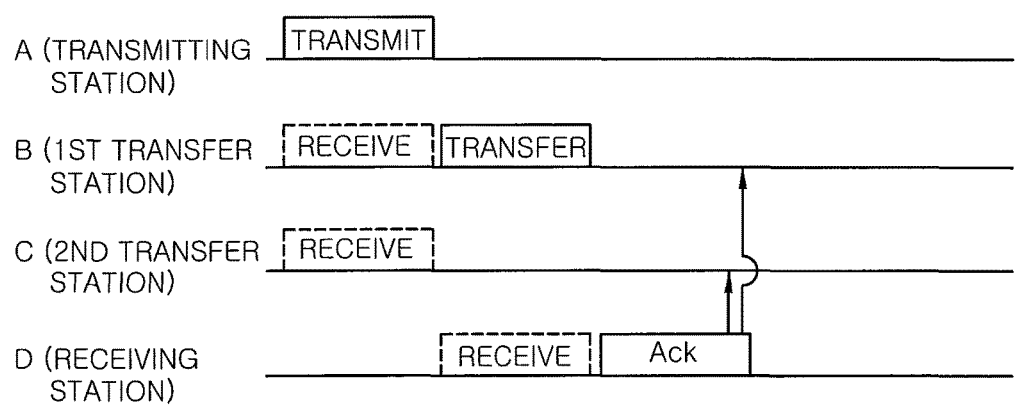
FIGS. 35A and 35B explain a first and a second example of transfer timing.
Figure 35B:
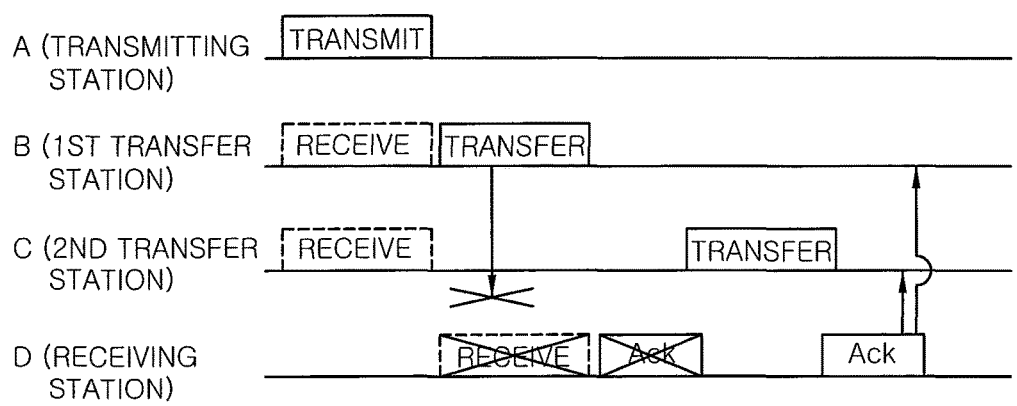

FIGS. 35A and 35B show the timing of transmitting the message packet from the wireless apparatus A to the wireless apparatus D in a state where four wireless apparatuses A to D are arranged as shown in FIG. 5. In the communication path having the first priority, the message packet is transmitted from the wireless apparatus A to the wireless apparatus D via the wireless apparatus B. In the communication path having the second priority, the message packet is transmitted from the wireless apparatus A to the wireless apparatus D via the wireless apparatus C.

5-1. First Example

FIG. 35A shows an example of the transfer timing in the case where there is no obstacle in the communication paths. In this case, the message packet transmitted from the wireless apparatus A as a transmitting station is received by the wireless apparatuses B and C as transfer stations. The wireless apparatus B having the first priority immediately transfers the message packet to the wireless apparatus D. On the other hand, a predetermined wait time of the wireless apparatus C starts to elapse and the corresponding message packet is destroyed when the Ack packet is received from the wireless apparatus D as a receiving station.

As a consequence, the message packet from the wireless apparatus A is transmitted to the wireless apparatus D via the wireless apparatus B.

5-2. Second Example

FIG. 35B shows the case in which communication failure occurs between the wireless apparatuses B and D. In this case, the message packet from the wireless apparatus A is received by the wireless apparatuses B and C as the transfer stations. The wireless apparatus B having the first priority immediately transfers the message packet to the wireless apparatus D as in the first example. However, the wireless apparatus D cannot receive the message packet and, thus, the Ack packet is not transmitted from the wireless apparatus D. Accordingly, the wireless apparatus C having the second priority cannot recognize that the message packet has reached the wireless apparatus D.

After the predetermined wait time elapses, the wireless apparatus C transfers the message packet received from the wireless apparatus A. The wireless apparatus D that has received the message packet transmits the Ack packet. The wireless apparatus C that has received the Ack packet recognizes that the message packet has reached the wireless apparatus D. In this manner, the message packet transmitted from the wireless apparatus A reaches the wireless apparatus D via the wireless apparatus C.

5-3. Third Example

There will be described a case in which a wireless apparatus having neither the first priority nor the second priority becomes a candidate for a wireless apparatus having the first or second priority due to deterioration of a communication quality between different wireless apparatuses.

Figure 36A:
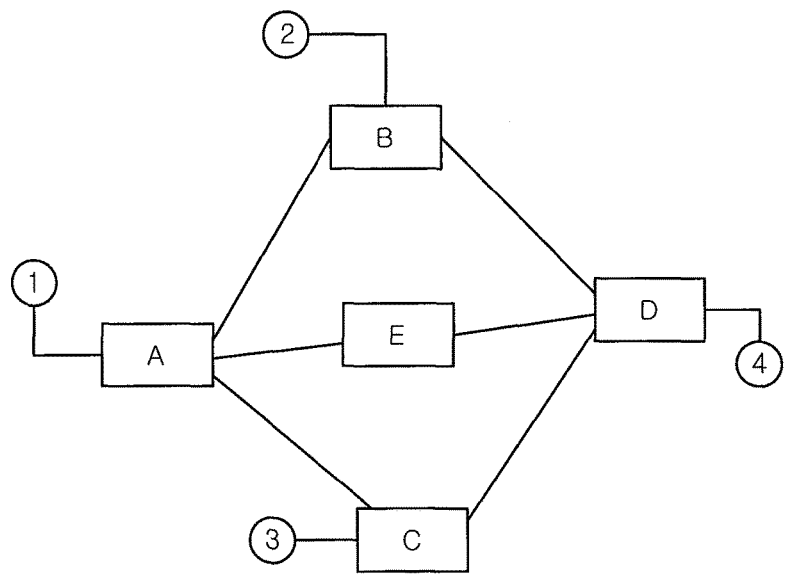
FIGS. 36A and 36B explain a third example of the transfer timing.

For example, the wireless apparatuses A to E are arranged as shown in FIG. 36A. The wireless apparatus B serves as a transfer station having the first priority for the wireless apparatus D and the wireless apparatus C serves as a transfer station having the second priority for the wireless apparatus D. The wireless apparatus E is provided as a transfer station having no priority.

The direct communication can be performed between the wireless apparatuses A and B, between the wireless apparatuses A and C, between the wireless apparatuses A and E, between the wireless apparatuses B and D, between the wireless apparatuses C and D, and between the wireless apparatuses E and D without transfer stations (expressed by solid lines in FIG. 36A).

If the communication quality between the wireless apparatuses B and D deteriorates, the link score of the wireless apparatus B which is calculated by the wireless apparatus D is decreased. If the communication quality between the wireless apparatuses C and D deteriorates, the link store of the wireless apparatus C which is calculated by the wireless apparatus D is also decreased.

In this state, low link scores of the wireless apparatuses B and C are stored in the address basis status area of the header of the Ack packet transmitted from the wireless apparatus D. The wireless apparatus E that has received the Ack packet and has been determined to have a higher link score becomes a candidate for a transfer station for performing the transfer to the wireless apparatus D.

Figure 36B:
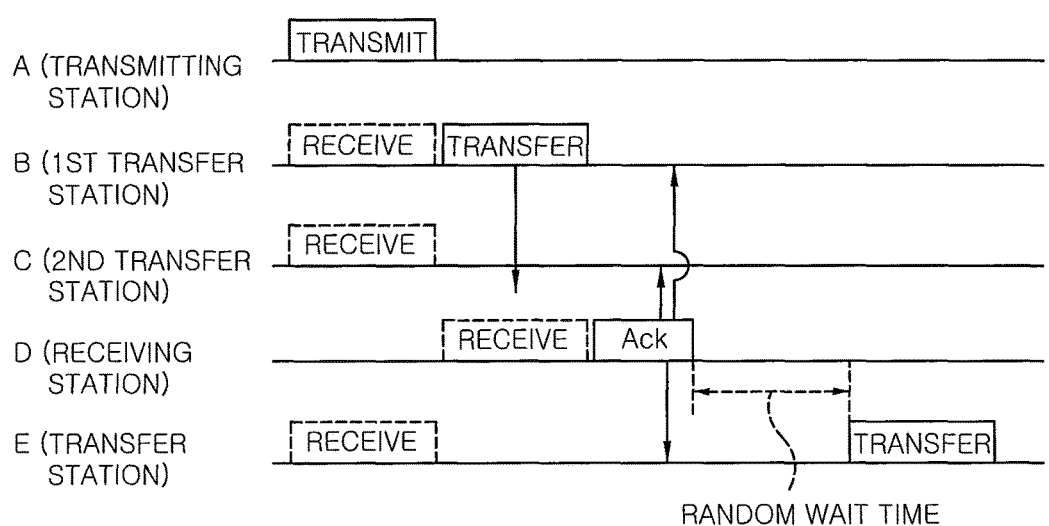

The wireless apparatus E becomes a candidate by transferring the received message packet. At this time, the broadcast communication or the unicast communication is performed. FIG. 36B shows the timing of the transfer operation of the wireless apparatus E.

The wireless apparatus D receives the message packet from the wireless apparatus B and transmits an Ack packet. The Ack packet from the wireless apparatus D is received by the wireless apparatuses B, C and E.

When the link score of the wireless apparatus C that has received the Ack packet is higher than that of the wireless apparatus B, the priority naturally changed by the process performed by the wireless apparatus D. Therefore, it is unnecessary for the wireless apparatus C having the second priority to perform the transfer operation at this time. For example, when the link scores that have been calculated whenever the wireless apparatus D receives the message packet from the wireless apparatus B are lower than the link score of the wireless apparatus C, the address basis status of the wireless apparatus D is updated and the wireless apparatus C has the first priority. This may occur even when the wireless apparatus C does not have a chance of transmitting the message packet to the wireless apparatus D.

The wireless apparatus E that has received the Ack packet is not stored in the address basis status of the wireless apparatus D. Thus, the wireless apparatus E needs to transmit the message packet to the wireless apparatus D and notify the wireless apparatus D of the link score thereof (to allow the wireless apparatus D to calculate the link score of the wireless apparatus E).

Accordingly, when determining that the link score of the wireless apparatus E that has received the Ack packet is higher than the first priority link score and the second priority link score, the wireless apparatus E transfers the same message packet to the wireless apparatus D after the random wait time (minimum period of time required until the transfer operations of the transfer stations having the first priority and the second priority are completed) elapses.

As shown in FIG. 36B, when directly receiving the Ack packet, the wireless apparatus E may elapse the random wait time from the timing of receiving the Ack packet with a minimum waiting time of 0.

The wireless apparatus D that has received the message packet from the wireless apparatus E calculates the link score of the wireless apparatus E and updates the address basis status, if necessary. Further, the neighboring wireless apparatuses B, C and E are informed of the address basis status of the wireless apparatus D when next and subsequent Ack packets (or proxy Ack packets) are transmitted. Accordingly, the wireless apparatuses B, C and E update the transfer tables and add/delete records to/from the address basis status.

In the third example, even when it is difficult to receive the message packet due to deterioration of the communication quality for the transfer stations having the first priority and the second priority, the message packet is transferred through an optimal communication path selected from the transfer stations including another transfer station. In other words, it is possible to maintain a state in which an optimal communication path can be selected.

6. Flowchart

Figure 37A:
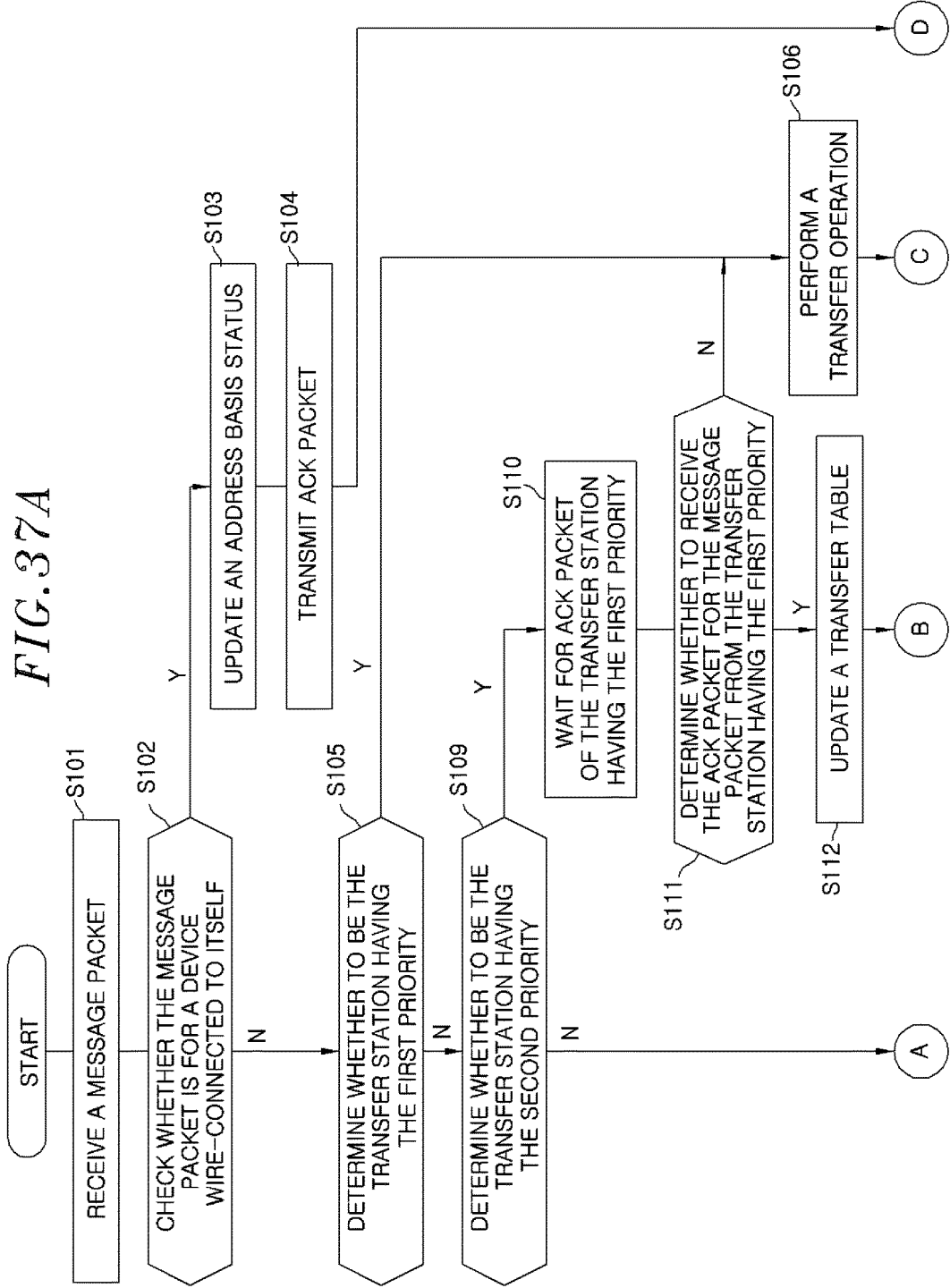
FIGS. 37A and 37B are a flowchart of processes performed by a wireless apparatus.
Figure 37B:
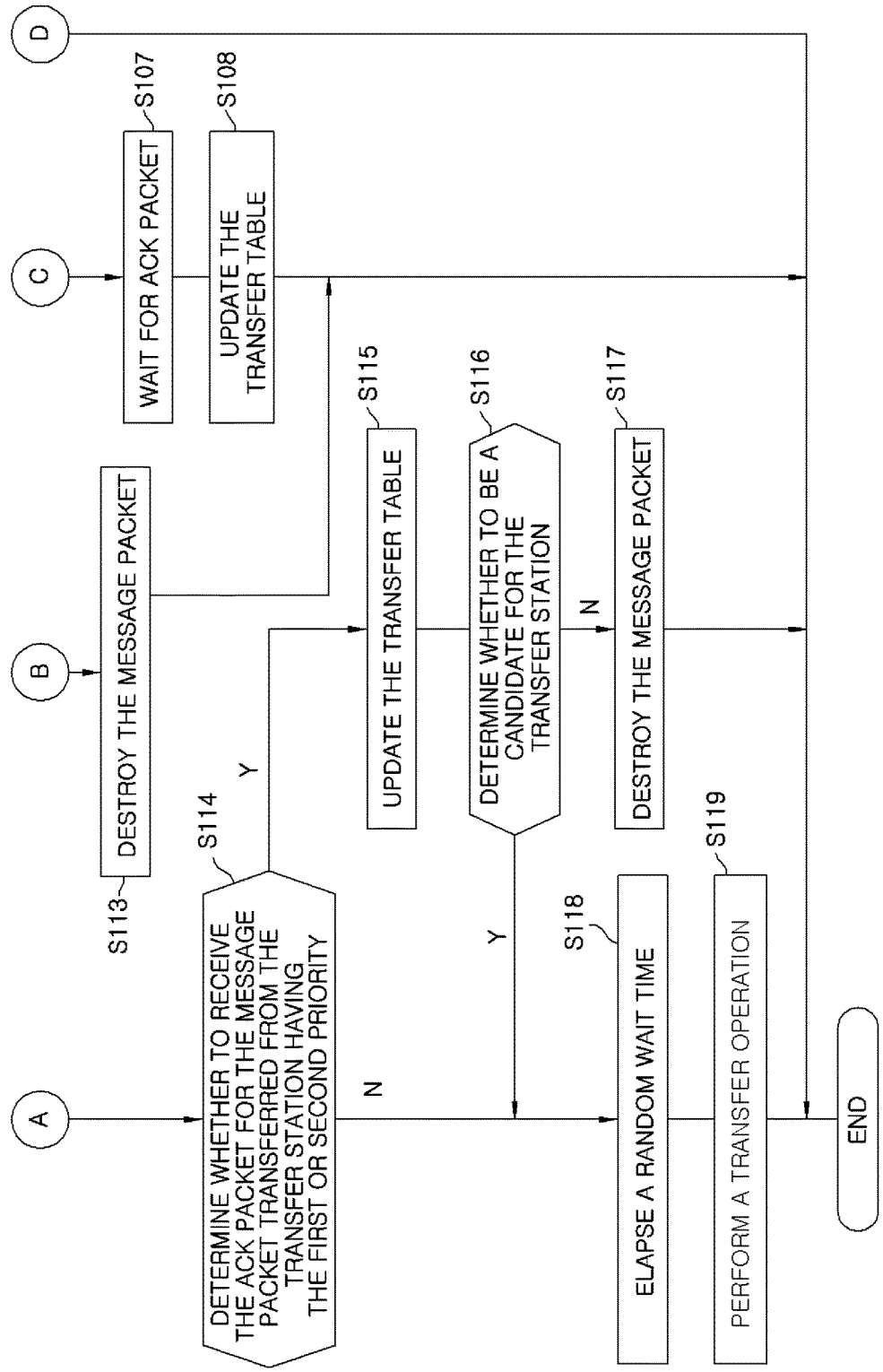

FIGS. 37A and 37B are a flowchart of the above processes performed by the wireless apparatus 100.

In a step S101, the wireless apparatus 100 receives a message packet. In a step S102, the wireless apparatus 100 checks whether or not the message packet is for a device wire-connected thereto. If the message packet is for the device wire-connected thereto, the wireless apparatus 100 updates the address basis status in a step S103. A specific updating process is the same as that described above.

Next, in a step S104, the wireless apparatus 100 transmits the Ack packet. In this manner, the wireless apparatus 100 completes a series of processes based on the reception of the message packet.

If it is determined in the step S102 that the message packet is not for the device wire-connected to the wireless apparatus 100, it is determined whether or not the wireless apparatus 100 is the transfer station having the first priority. When the wireless apparatus 100 is the transfer station having the first priority, the wireless apparatus 100 performs a transfer operation in a step S106 by using unicast communication based on the transfer table.

Then, in a step S107, the wireless apparatus 100 waits for reception of the Ack packet. The Ack packet includes a proxy Ack packet.

Thereafter, in a step S108, the wireless apparatus 100 updates the transfer table.

On the other hand, when the wireless apparatus 100 is not the transfer station having the first priority, it is determined whether or not the wireless apparatus 100 is the transfer station having the second priority in a step S109. When the wireless apparatus 100 is the transfer station having the second priority, the wireless apparatus 100 waits for an Ack packet of the transfer station having the first priority in a step S110. In other words, a fixed wait time elapses.

Next, in a step S111, it is determined whether or not the wireless apparatus 100 has received the Ack packet for the message packet from the transfer station having the first priority while waiting for the Ack packet. The Ack packet may be a proxy Ack packet.

When the Ack packet is not received, the wireless apparatus 100 serves as the transfer station by performing the processes of the steps S106 to S108.

When it is determined in the step S111 that the Ack packet is not received, the wireless apparatus 100 updates the transfer table in a step S112 and destroys the message packet in a step S113. In this manner, the wireless apparatus 100 completes a series of processes based on the reception of the message packet.

When the wireless apparatus 100 is neither the transfer station having the first priority nor the transfer station having the second priority, it is determined in a step S114 whether or not the wireless apparatus 100 has received the Ack packet for the message packet transferred from the transfer station having the first priority or the transfer station having the second priority. When the Ack packet has been received, the wireless apparatus 100 updates the transfer table in a step S115. Thereafter, it is determined in a step S116 whether or not the wireless apparatus 100 is a candidate for the transfer station.

When the wireless apparatus 100 is not a candidate for the transfer station, the wireless apparatus 100 destroys the received message packet in a step S117. In this manner, the wireless apparatus 100 completes a series of processes based on the reception of the message packet.

When the Ack packet has not been received in the step S114 or when it is determined in the step S116 that the wireless apparatus 100 is a candidate for the transfer station, the random wait time elapses in a step S118. Next, in a step S119, the wireless apparatus 100 performs a transfer operation. In this manner, the wireless apparatus 100 completes a series of processes based on the reception of the message packet.

7. Modification

In the above, there has been described an example in which the priority of wireless apparatuses from which a wireless apparatus receives the message packet is not changed. In other words, the wireless apparatus D has the first priority in transferring the message packet to the wireless apparatus E in FIG. 21 and this is not changed in FIG. 29.

However, it is general that the wireless communication environment constantly changes and the priority of the wireless apparatuses may not be the same as that described above. Thus, whenever the message packet is transmitted/received, the link score between the wireless apparatuses is calculated and the address basis status is updated, if necessary. At this time, the order of the address basis status may be changed immediately as the link score is reversed once. Accordingly, it is possible to immediately deal with changes of the wireless communication environment.

Further, the priority of the address basis status may be updated as the link score is reversed a predetermined number of times (e.g., three times or the like).

Further, even if the communication has no problem, the wireless communication environment (i.e., the link score) may be different whenever the measurement is performed. In that case, if the communication path having the first priority is changed whenever the message packet is transmitted, the transmission/reception of the message packet by the broadcast communication is increased and this leads to an increase in the amount of communication. The stable communication environment can be obtained by avoiding updating of the address basis status until the link score is reversed a predetermined number of times.

A hysteresis of the link score may be provided instead of the predetermined number of times. For example, it is assumed that the wireless apparatus B has higher priority between the wireless apparatuses B and C for transmitting the message packet to the wireless apparatus A. The link score between the wireless apparatuses A and B is 200 and the link score between the wireless apparatuses A and C is 150. At this time, if the second priority link score is not higher than the first priority link score by 20 or above, the address basis status is not updated. By employing such setting, the stable communication environment can be obtained.

When the link score of the first priority is higher than a predetermined value, the address basis status may not be updated regardless of the link score of the second priority. By employing such setting, the stable communication environment can be obtained.

In the above, there has been described an example in which the link score is calculated whenever the message packet is received. However, the link score may be also calculated when the Ack packet or the proxy Ack packet is received. Accordingly, the frequency of calculating the link score is increased and the timing of switching to the optimal communication path can be advanced. In other words, the frequency of using the communication path having a poor communication quality can be reduced.

In FIG. 28, the wireless apparatus A recognizes that the message packet for the device 5 is to be transferred to the wireless apparatus B. However, new records for the device 5 may be added to the address basis status of the wireless apparatus A in consideration of the case in which the wireless apparatus A serves as a transfer station when another wireless apparatus not shown in FIG. 28 transmits the message packet to the device 5.

Accordingly, the address basis status Aa of the wireless apparatus A serving as the transfer station for transferring the message packet to another wireless apparatus can be quickly updated. As a result, it is possible to shorten a period of time required until an optimal communication path is selected to transit to the unicast communication.

In the same manner, new records for the device 1 are added to the address basis status Ae in FIG. 32.

8. Statistics

As described above, the wireless apparatus constituting the wireless mesh network for transmitting the message packet includes: the communication control unit 100*a* for controlling communication; the transmission unit 100*b* for transmitting the message packet; the reception unit 100*c* for receiving the message packet; and the storage unit 100*d* for storing the transfer table in which the transfer destination information is linked with the transfer priority indicating a priority of wireless apparatuses for transferring the message packet to the transfer destination. The communication control unit 100*a* refers to the transfer table stored in the storage unit 100*d* based on the information of the transmission source and the transmission destination included in the received message packet. When the wireless apparatus of the transfer destination or the transfer priority is not determined, the transfer operation using broadcast communication in which the wireless apparatus of the transfer destination is not specified is performed. When the wireless apparatus of the transfer destination and the transfer priority are determined, the transfer operation using unicast communication in which the wireless apparatus of the transfer destination is specified is performed.

Accordingly, the broadcast communication is shifted to the unicast communication sequentially from the wireless apparatus of which transfer destination is determined based on the transfer table. As a result, the communication path is determined and the amount of communication can be reduced.

Further, the information for specifying a priority of a wireless apparatus in transferring the message packet to the wireless apparatus of the transfer destination is stored in the transfer table. Therefore, when a communication path having the first priority cannot be used, an alternative communication path is selected. Accordingly, the transmission of the message packet can be ensured and the stable communication can be performed. At this time, the wireless apparatus as the transmission source of the message packet does not need to resend the message packet. Thus, the increase in the period of time required until the message packet from the transmission source reaches the final transmission destination can be suppressed.

When the message packet received from another wireless is transferred, if the wireless of the transfer destination or the transfer priority is not determined, the communication control unit 100*a* of the wireless apparatus performs, after the random wait time elapses, the transfer operation using broadcast communication in which the wireless apparatus of the transfer destination is not specified. If the wireless apparatus of the transfer destination and the transfer priority are determined, the communication control unit 100*a* performs, after the wait time set based on the transfer priority elapses, the transfer operation using unicast communication in which the wireless apparatus of the transfer destination is specified.

Accordingly, a plurality of wireless apparatuses transfers the message packet to the wireless apparatus of the transfer destination after respective wait times elapse. As a result, the possibility of the wireless communication collision can be reduced.

When the message packet transferred to the wireless apparatus of the transfer destination by using unicast communication is transmitted to the reception unit 100*c*, the communication control unit 100*a* of the wireless apparatus considers the received message packet as the Ack packet. Accordingly, the wireless apparatus of the transfer destination does not need to additionally transmit the Ack packet. As a result, the amount of communication can be reduced.

When a communication path is not determined, the communication control unit 100*a* of the wireless apparatus does not allow the transmission unit to transmit a dedicated packet for determining a communication path. Therefore, a communication path having the priority can be determined during the transmission/reception of the message packet including the user data. Accordingly, the increase in the amount of communication can be suppressed.

In the transfer table of the wireless apparatus, the information of which transfer priority is undetermined or at least the first or the second is stored. As a consequence, the information stored in the transfer table is restricted and, thus, the storage capacity of the storage unit can be suppressed.

While the present disclosure has been shown and described with respect to the embodiments, it will be understood by those skilled in the art that various changes and modifications may be made without departing from the scope of the disclosure as defined in the following claims.

What is claimed is:

1. A wireless apparatus constituting a wireless mesh network for transferring a message packet, comprising:
    a communication control unit including a processor, and configured to control communication;
    a reception unit configured to receive the message packet; and
    a storage unit configured to store a transfer table in which transfer destination information is linked with a transfer priority indicating a priority of the wireless apparatus among wireless apparatuses for transferring the message packet to a transfer destination,
    wherein the transfer table includes a transfer destination storage area for storing the transfer destination generated based on the message packet and a transfer priority storage area for storing the transfer priority generated based on the message packet,
    wherein the communication control unit refers to the transfer table stored in the storage unit based on information on a transmission source and a transmission destination included in the received message packet,
    wherein, in response to a determination that no transfer destination is stored in the transfer destination storage area or that no transfer priority is stored in the transfer priority storage area, the communication control unit performs a transfer operation using broadcast communication in which the transfer destination is not specified, and
    wherein, in response to a determination that a transfer destination is stored in the transfer destination storage area and a transfer priority is stored in the transfer priority storage area, the communication control unit performs a transfer operation using unicast communication in which the transfer destination is specified.

2. The wireless apparatus of claim 1, wherein when the message packet to transfer to the transfer destination is a message packet received from another wireless apparatus, in response to a determination that the transfer destination storage area has no transfer destination stored in the transfer destination storage area or the transfer priority storage area has no transfer priority stored in the transfer priority storage area, the communication control unit performs, after random wait time elapses, the transfer operation using the broadcast communication in which the transfer destination is not specified, and
    wherein, in response to a determination that a transfer destination is stored in the transfer destination storage area and that a transfer destination is stored in the transfer priority storage area, the communication control unit performs, after wait time set based on the transfer priority elapses, the transfer operation using the unicast communication in which the transfer destination is specified.

3. The wireless apparatus of claim 1, wherein when the reception unit receives the message packet that has been transferred to the transfer destination by using the unicast communication, the communication control unit considers the received message packet as an acknowledgement packet.

4. The wireless apparatus of claim 1, wherein when a communication path is not determined, the communication control unit does not allow the transmission unit to transmit a dedicated packet for determining a communication path.

5. The wireless apparatus of claim 1, wherein the transfer table stores information of which transfer priority is undetermined or at least the first or the second.

6. A network system comprising a plurality of wireless apparatuses, each of which including:
    a communication control unit including a process and configured to control communication;
    a reception unit configured to receive the message packet; and
    a storage unit configured to store a transfer table in which transfer destination information is linked with a transfer priority indicating a priority of the wireless apparatus among wireless apparatuses for transferring the message packet to a transfer destination,
    wherein the transfer table includes a transfer destination storage area for storing the transfer destination generated based on the message packet and a transfer priority storage area for storing the transfer priority generated based on the message packet,
    wherein the communication control unit refers to the transfer table stored in the storage unit based on information on a transmission source and a transmission destination included in the received message packet,
    wherein, in response to a determination that no transfer destination is stored in the transfer destination storage area or that no transfer priority is stored in the transfer priority storage area, the communication control unit performs a transfer operation using broadcast communication in which the transfer destination is not specified, and
    wherein, in response to a determination that a transfer destination is stored in the transfer destination storage area and a transfer priority is stored in the transfer priority storage area, the communication control unit performs a transfer operation using unicast communication in which the transfer destination is specified.

7. A control method of a wireless apparatus including a transmission unit configured to transmit a message packet, a reception unit configured to receive the message packet, a processor and a memory including a storage unit configured to store a transfer table in which transfer destination information is linked with a transfer priority indicating a priority of the wireless apparatus among wireless apparatuses for transferring the message packet to a transfer destination, the method comprising:
    referring to the transfer table stored in the storage unit based on information on a transmission source and a transmission destination included in the received message packet, wherein the transfer table includes a transfer destination storage area for storing the transfer destination generated based on the message packet and a transfer priority storage area for storing the transfer priority generated based on the message;

performing, in response to a determination that no transfer destination is stored in the transfer destination storage area or that no transfer priority is stored in the transfer priority storage area, a transfer operation using broadcast communication in which the transfer destination is not specified; and performing, in response to a determination that a transfer destination is stored in the transfer destination storage area and that a transfer priority is stored in the transfer priority storage area, a transfer operation using unicast communication in which the transfer destination is specified.

\* \* \* \* \*